US011867327B2

(12) United States Patent
Marc et al.

(10) Patent No.: US 11,867,327 B2
(45) Date of Patent: Jan. 9, 2024

(54) FLUID-TIGHT FITTING

(71) Applicant: JPB Système, Montereau sur le Jard (FR)

(72) Inventors: Damien Marc, Blandy (FR); Denis Messager, Melun (FR); Jonathan Alain Beaumel, Vaires sur Marne (FR)

(73) Assignee: JPB Système, Montereau sur le Jard (FR)

( * ) Notice: Subject to any disclaimer, the term of this patent is extended or adjusted under 35 U.S.C. 154(b) by 346 days.

(21) Appl. No.: 17/271,997

(22) PCT Filed: Sep. 12, 2019

(86) PCT No.: PCT/FR2019/000143
§ 371 (c)(1),
(2) Date: Feb. 26, 2021

(87) PCT Pub. No.: WO2020/053488
PCT Pub. Date: Mar. 19, 2020

(65) Prior Publication Data
US 2021/0317930 A1   Oct. 14, 2021

Related U.S. Application Data

(60) Provisional application No. 62/730,689, filed on Sep. 13, 2018.

(51) Int. Cl.
*F16L 19/06*   (2006.01)
*F16L 19/025*   (2006.01)

(52) U.S. Cl.
CPC ......... *F16L 19/025* (2013.01); *F16L 2201/10* (2013.01); *F16L 2201/60* (2013.01)

(58) Field of Classification Search
CPC ......... F16L 19/02; F16L 19/025; F16L 19/06; F16L 47/04; F16L 2201/10
USPC .................................. 285/93, 386, 388, 389
See application file for complete search history.

(56) References Cited

U.S. PATENT DOCUMENTS

| 2,211,776 | A | * | 8/1940 | Haury | ................. | F16L 27/1008 |
| | | | | | | 285/341 |
| 3,521,910 | A | | 7/1970 | Callahan, Jr. et al. | | |
| 4,655,159 | A | * | 4/1987 | McMills | ................. | B25B 23/14 |
| | | | | | | 285/382.7 |
| 6,409,222 | B1 | * | 6/2002 | Donoho | .............. | F16L 19/0283 |
| | | | | | | 411/14 |
| 2002/0023504 | A1 | | 2/2002 | Austin | | |

(Continued)

FOREIGN PATENT DOCUMENTS

EP   0219349 A1   4/1987

OTHER PUBLICATIONS

European Patent Office; Partial Search Report and Written Opinion in related International Patent Application No. PCT/FR2019/000143 dated Dec. 5, 2019; 17 pages.

(Continued)

*Primary Examiner* — Aaron M Dunwoody
(74) *Attorney, Agent, or Firm* — Dorton & Willis, LLP

(57) ABSTRACT

A fluid-tight fitting includes at least one strain gauge or includes at least one passage, said passage extending radially through a nut and communicating with an interior chamber defined by a first conduit, a second conduit, and the nut, or includes a visual indicator associated with at least one of a nut or a first conduit of the fitting.

9 Claims, 32 Drawing Sheets

(56) References Cited

U.S. PATENT DOCUMENTS

2011/0278837 A1 11/2011 Yamamoto et al.
2016/0298796 A1 10/2016 Anton

OTHER PUBLICATIONS

European Patent Office; Search Report in related International Patent Application No. PCT/FR2019/000143 dated Feb. 28, 2020; 21 pages.

* cited by examiner

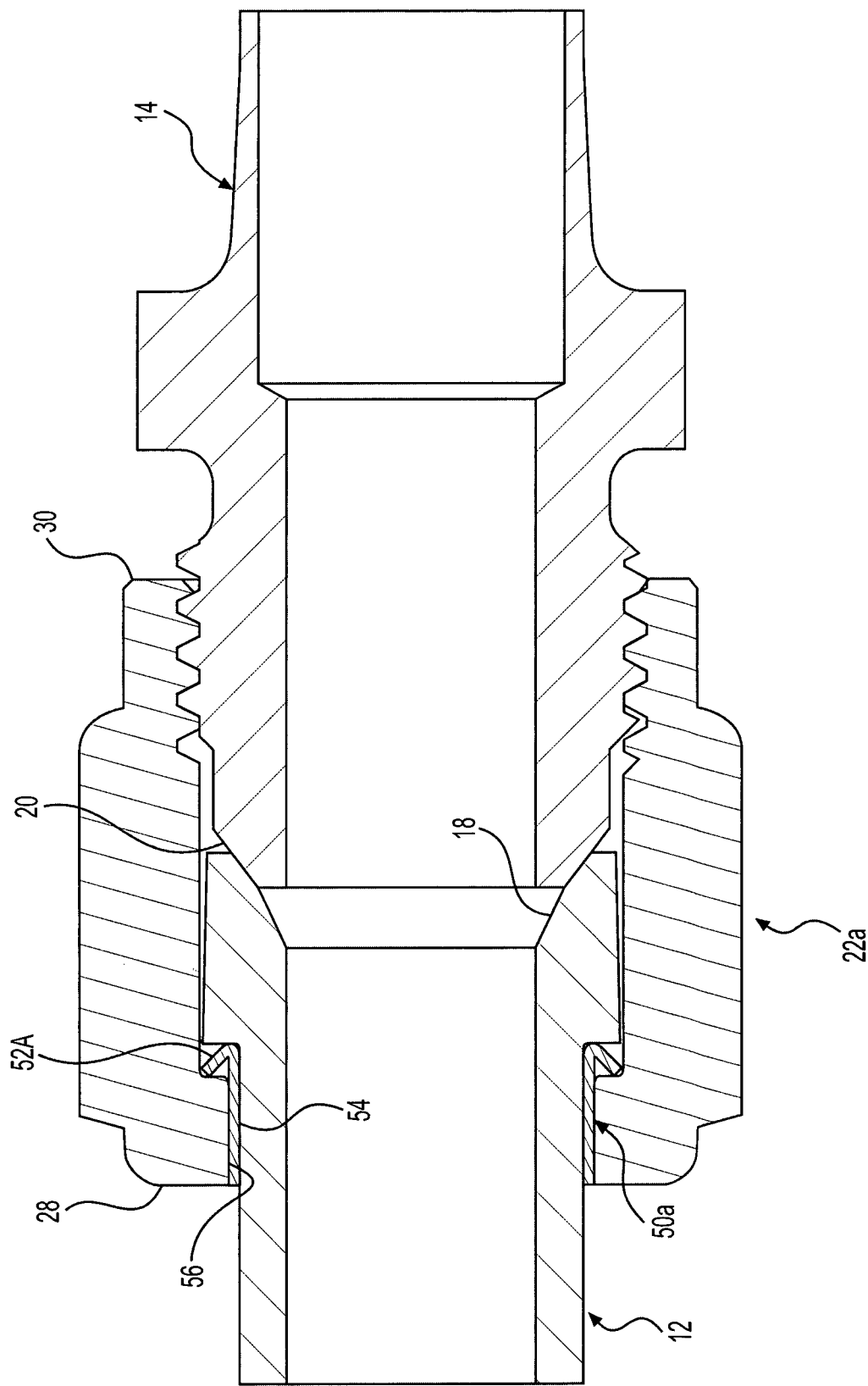

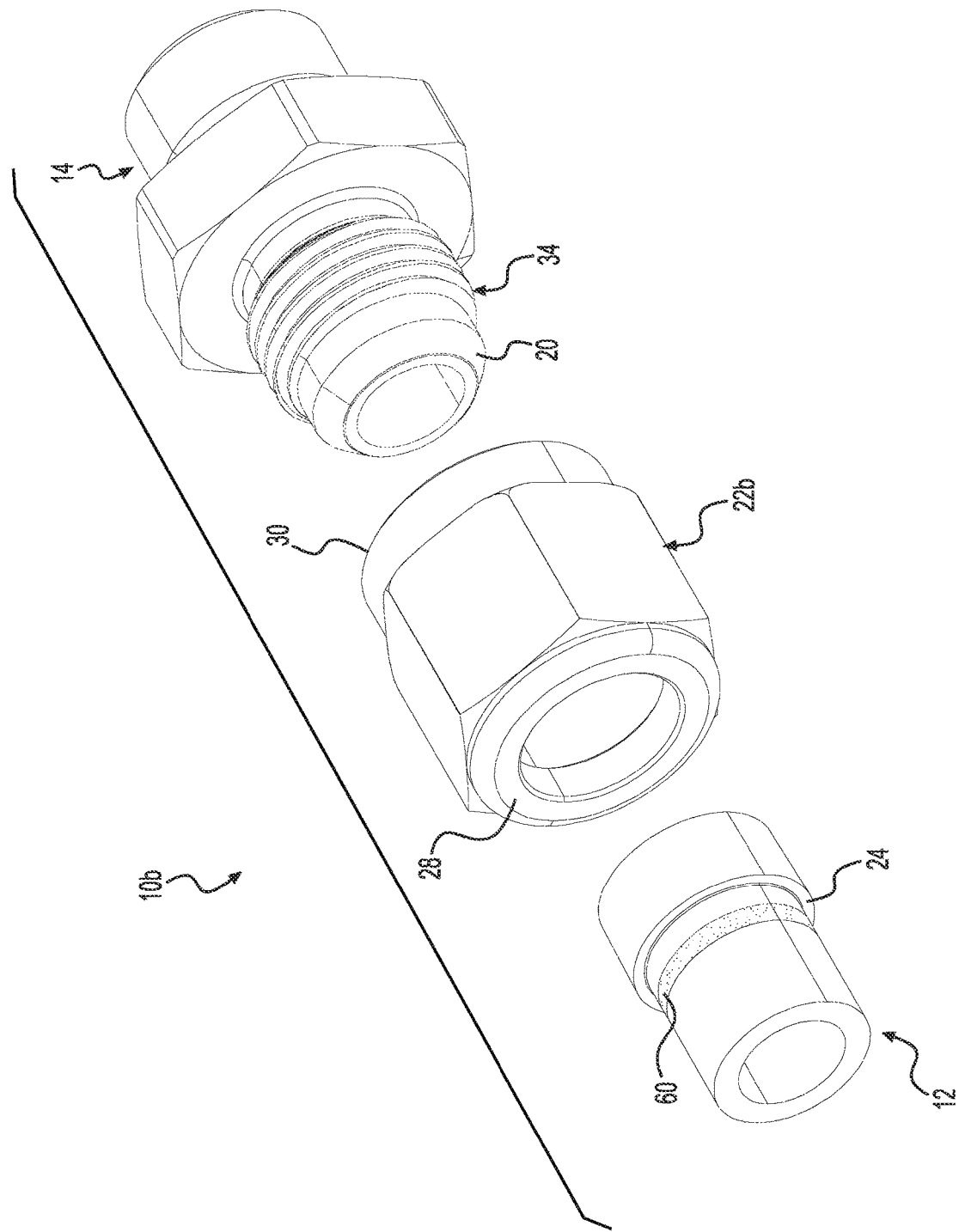

FLUID-TIGHT FITTING

CROSS-REFERENCE TO RELATED APPLICATIONS

This application is a national phase application under 35 U.S.C. § 371 of International Patent Application No. PCT/FR2019/000143, filed Sep. 12, 2019 (pending), which claims the benefit of priority to U.S. Patent Application No. 62/730,689, filed Sep. 13, 2018, the disclosures of which are incorporated by reference herein in their entirety.

TECHNICAL FIELD

The present invention relates generally to fluid-tight fittings and, more particularly, to an improved nut for use in fluid-tight fittings.

BACKGROUND

Fluid-tight fittings are commonly used in a variety of applications where it is desired to couple together two conduits for the transmission of fluid therebetween. A conventional fluid-tight fitting includes a nut received over a first conduit and having threads for engaging corresponding threads provided on a second conduit, whereby a fluid-tight connection is formed by threadably tightening the nut onto the threads of the second conduit. Loosening of the threaded connection can occur during use, such as when the joint is exposed to movement, vibration, or various other dynamic forces. Accordingly, it is desired to provide a simple method for readily ascertaining whether a given fluid-tight joint is suitably connected.

SUMMARY

According to one embodiment of the present invention an object of the present invention is to provide a, preferably improved, fluid-tight connection of a first and a second conduit. Said object is solved in particular by a nut assembly according to claim 1 or 11 respectively, a fluid tight assembly according to claim 8, 10 or 11 respectively, or a method according to one of claims 13-15 respectively. Sub-claims refer to preferred embodiments.

According to one embodiment the present invention provides an improved fluid-tight fitting for connecting first and second conduits and which facilitates ready determination of a secure condition of the fitting. In one embodiment, a fluid-tight fitting or assembly respectively includes a first conduit having a first distal end, a second conduit having a first threaded portion, and a nut received over the first end of the first conduit and having a second threaded portion engageable, in particular engaged, with the first threaded portion of the second conduit. A visual indicator may be associated with at least one of the nut or the first conduit. The visual indicator has a first condition wherein an indicating portion of the visual indicator is hidden from view relative to the exterior of the nut, and a second condition wherein the indicating portion of the visual indicator is visible from the exterior of the nut when the assembly is fully tightened.

"Fully tightened" in the meaning of the present invention may in particular denote a fluid-tight connection. According to one embodiment the assembly is not (fully) tightened or not fluid-tight or does not provide a fluid-tight connection respectively when the visual indicator has the first condition or the visual indicator has the first condition wherein the indicating portion of the visual indicator is hidden from view relative to the exterior of the nut when the assembly is not (fully) tightened or not fluid-tight or does not provide a fluid-tight connection respectively or is configured accordingly.

A method of inspecting the fluid-tight assembly may comprise the steps of: viewing at least a portion of the exterior of the fluid tight-assembly and identifying the presence or absence of the visual indicator.

In another embodiment, a fluid-tight fitting includes a nut having a nut body with first and second oppositely disposed distal ends. A tightening feature is provided on the nut body and adapted to receive a tool for tightening the nut in the fitting. One or more strain gauge(s) is/are disposed on the nut and configured to sense a strain experienced by the nut and related to a tightened condition of the assembly. A method of inspecting the fluid-tight assembly may comprise the step of monitoring the strain sensed by the strain gauge(s).

In yet another embodiment, a fluid-tight assembly includes a first conduit, a second conduit, a nut received over a first end of the first conduit and having a second threaded portion engageable, in particular engaged, with a first threaded portion of the second conduit, wherein the first conduit, the second conduit and the nut define an interior chamber proximate an intersection of the first and second conduits and the nut in a tightened condition of the assembly, and one or more passage(s each) extending radially through the nut, between the outer surface and the inner surface, the one or more passage(s) communicating with the interior chamber in the tightened condition and adapted to receive fluid, in particular at a controlled pressure, thereby facilitating the monitoring of the sealing integrity of the interior chamber. A method of inspecting the fluid-tight assembly may comprise the steps of applying a positive or negative pressure to the interior chamber through the at least one passage and monitoring the pressure in the interior chamber to detect a change.

While the invention will be described in connection with certain embodiments, it will be understood that the invention is not limited to these embodiments. On the contrary, the invention includes all alternatives, modifications, and equivalents as may be included within the spirit and scope of the present invention.

According to an example Embodiment 1 a fluid tight assembly comprises:
  a first conduit having a first distal end; a second conduit having a first threaded portion; and a nut assembly according to an example Embodiment 1' of the present invention, said nut assembly comprising:
  a nut, in particular having, in particular being, a nut body, received over the first end of the first conduit and having a second threaded portion engageable, in particular engaged, with the first threaded portion of the second conduit or configured thereto respectively; and
  a visual indicator, in particular associated with at least one of the nut or the first conduit, the visual indicator having a first condition wherein an indicating portion of the visual indicator is hidden from view relative to the exterior of the nut, and a second condition wherein the indicating portion of the visual indicator is visible from the exterior of the nut when the assembly is fully tightened.

According to an example Embodiment 2 in the fluid tight or nut assembly of Example 1 or 1' respectively the visual indicator comprises one or more legs disposed within the nut, the leg(s) movable or being moved respectively by engagement with the first conduit between the first and second conditions.

According to an example Embodiment 3 in the fluid-tight or nut assembly respectively of Example Embodiment 2 the leg or one or more of the legs is/are deflected into the second condition by engagement with the first conduit when the assembly is fully tightened.

According to an example Embodiment 4 in the fluid-tight or nut assembly respectively of Example Embodiment 2 or 3 the leg or one or more of the legs has/have a bent L-shape having a first portion with a distal end that engages the first conduit.

According to an example Embodiment 5 in the fluid-tight or nut assembly respectively of Example Embodiment 2, 3 or 4, the fluid-tight assembly or nut assembly respectively further comprises one or more slots formed in the interior of the nut (body) and extending along an axial direction thereof. According to an embodiment said slot or one or more of said slots(each) receive the leg or one of the legs respectively or is/are configured thereto respectively.

According to an example Embodiment 6 in the fluid-tight or nut assembly respectively of Example Embodiment 2, 3, 4 or 5 the visual indicator comprises a conical spring washer received within the nut, the leg or one or more of the legs extending axially away from the washer and moved between the first and second conditions by deformation of the washer when engaged by the first conduit during tightening of the assembly.

According to an example Embodiment 7 in the fluid-tight or nut assembly respectively of any of Example Embodiments 2-6 the leg or one or more of the legs is/are treated to facilitate visual perception in the second condition.

According to an example Embodiment 8 in the fluid-tight or nut assembly of Example Embodiment 1 or 1' respectively the visual indicator comprises: an annular ring received within the nut; an elastomeric indicator portion disposed on the annular ring and having a central portion extending radially inwardly from the ring; the central portion disposed between the first conduit and the nut in an installed condition of the assembly or being configured thereto respectively; the elastomeric indicator compressed by the first conduit in the second condition such that the central portion is forced to a position visible from the exterior of the nut or being configured thereto respectively.

According to an example Embodiment 9 in the fluid-tight or nut assembly of Example Embodiment 1 or 1' respectively the visual indicator comprises a discrete marker disposed on the first conduit, wherein the position of the nut relative to the first conduit exposes the marker for viewing from the exterior of the nut in the second condition or the marker and/or nut being configured thereto respectively.

According to an example Embodiment 10 a fluid-tight assembly comprises: a first conduit having a first distal end; a second conduit having a first threaded portion; a nut received over the first end of the first conduit and having a second threaded portion engageable with the first threaded portion of the second conduit; the first conduit, the second conduit, and the nut defining an interior chamber proximate an intersection of the first and second conduits and the nut in a tightened condition of the assembly; and one or more passage(s each) extending radially through the nut, between the outer surface and the inner surface, the passage or one or more of the passages (each) communicating with the interior chamber; the passage or one or more of the passages (each) communicating with the interior chamber in the tightened condition and receiving fluid, in particular at a controlled pressure, thereby facilitating the monitoring of the sealing integrity of the interior chamber, or being adapted thereto respectively.

According to an example Embodiment 11 a fluid-tight assembly comprises: a nut having a nut body with first and second oppositely disposed distal ends; a tightening feature on the nut body adapted to receive a tool for tightening the nut in the assembly; one or more strain gauge(s) disposed on the nut, the strain gauge or one or more of the strain gauges configured to sense a strain experienced by the nut and related to a tightened condition of the assembly.

According to an example Embodiment 12 in the Example Embodiment 11 the assembly further comprises: communication circuitry associated with the nut and configured to communicate signals related to the stress experienced by the nut, in particular strain experienced by the nut and related to a tightened condition of the assembly and sensed by the strain gauge or one or more of the strain gauges respectively.

According to an example Embodiment 13 he fluid-tight assembly of Example Embodiment 12 further comprises: a reading device adapted to receive signals from the communication circuitry.

According to an example Embodiment 14 in a method of inspecting a fluid-tight assembly, the fluid-tight assembly comprising a first conduit, a second conduit, and a nut coupled with the first and second conduits, and a visual indicator associated with the nut or the first conduit, the visual indicator having a first condition wherein an indicating portion of the visual indicator is hidden from view relative to the exterior of the nut, and a second condition wherein the indicating portion of the visual indicator is visible from the exterior of the nut when the assembly is fully tightened, the method comprises: viewing at least a portion of the exterior of the fluid tight-assembly; and identifying the presence or absence of the visual indicator.

According to an example Embodiment 15 in a method of inspecting a fluid-tight assembly, the fluid-tight assembly comprising a first conduit, a second conduit having a threaded portion, and a nut coupled with the first and second conduits and having a threaded portion that is engageable, in particular engaged, with the threaded portion of the second conduit, the first and second conduits and the nut defining an interior chamber proximate an intersection thereof in a tightened condition of the assembly, the nut further including at least one passage extending radially through the nut, the method comprises: applying a positive or negative pressure to the interior chamber through the at least one passage; and monitoring the pressure in the interior chamber to detect a change.

According to an example Embodiment 16 in a method of inspecting a fluid-tight assembly, the fluid-tight assembly comprising a first conduit, a second conduit having a threaded portion, and a nut coupled with the first and second conduits and having a threaded portion that is engageable, in particular engaged, with the threaded portion of the second conduit, the nut having a nut body with first and second oppositely disposed distal ends, a tightening feature on the nut body adapted to receive a tool for tightening the nut in the assembly, and at least one strain gauge disposed on the nut, the strain gauge configured to sense a strain experienced by the nut and related to a tightened condition of the assembly, the method comprises: monitoring the strain sensed by the at least one strain gauge.

According to an example Embodiment 17 a method of inspecting a fluid-tight assembly comprises one or more steps as shown and described herein and/or using a nut or fluid-tight assembly as shown and described herein respectively. According to an example Embodiment 18 a fluid-tight assembly comprises one or more features as shown and described herein and/or is configured to carry out a method as shown and described herein.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this Specification, illustrate exemplary embodiments of the invention and, together with a general description of the invention given above, and the detailed description given below, serve to explain the principles of the invention.

FIG. 8A is a cross-sectional view of an alternative embodiment of the fitting of FIG. 7 in the first condition.

FIG. 11 is an exploded perspective view of a third exemplary embodiment of a fluid-tight fitting in accordance with the principles of the present disclosure.

DETAILED DESCRIPTION

Figure 1:
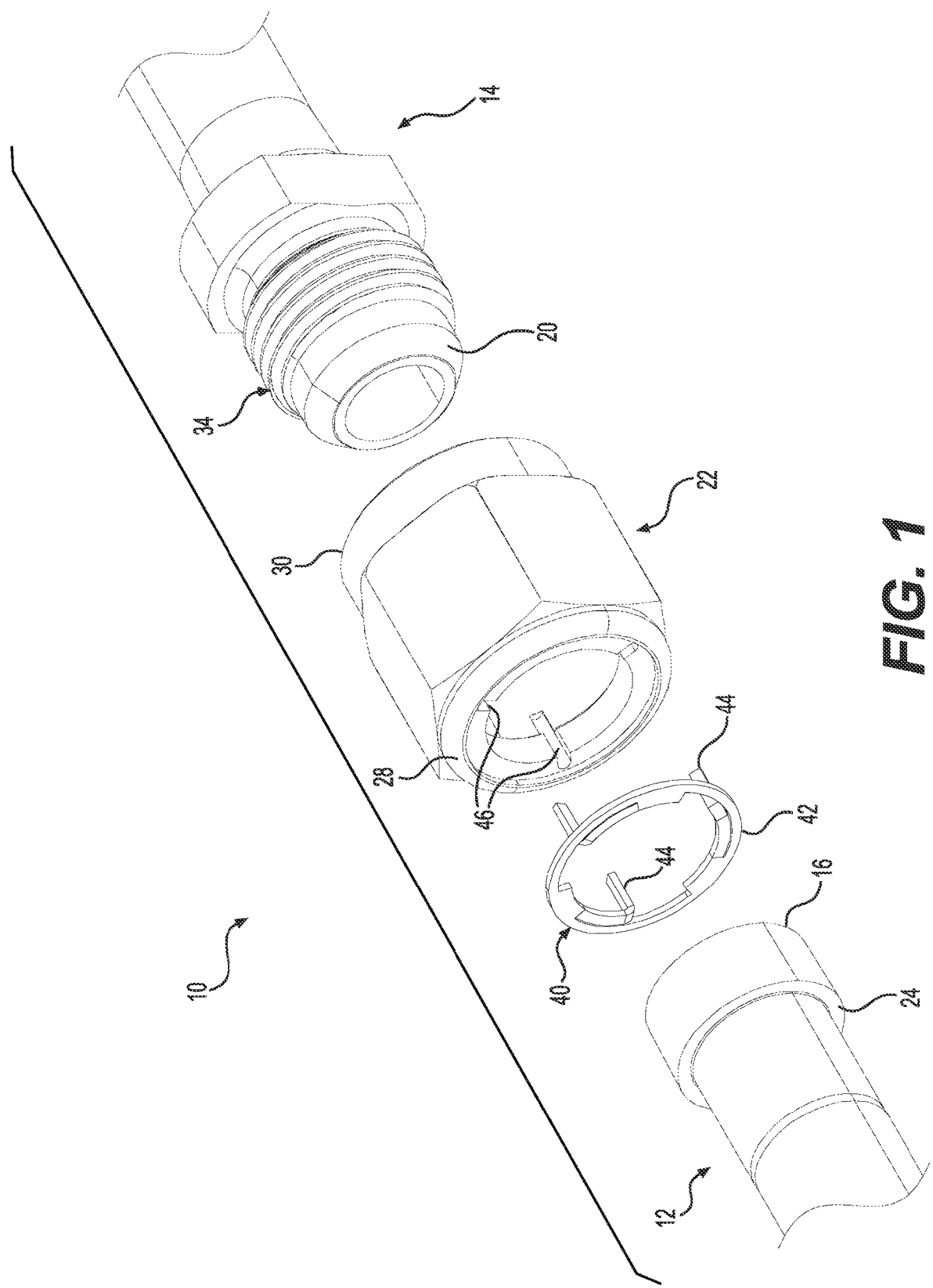
FIG. 1 is an exploded perspective view of a first exemplary embodiment of a fluid-tight fitting in accordance with the principles of the present disclosure.
Figure 2:
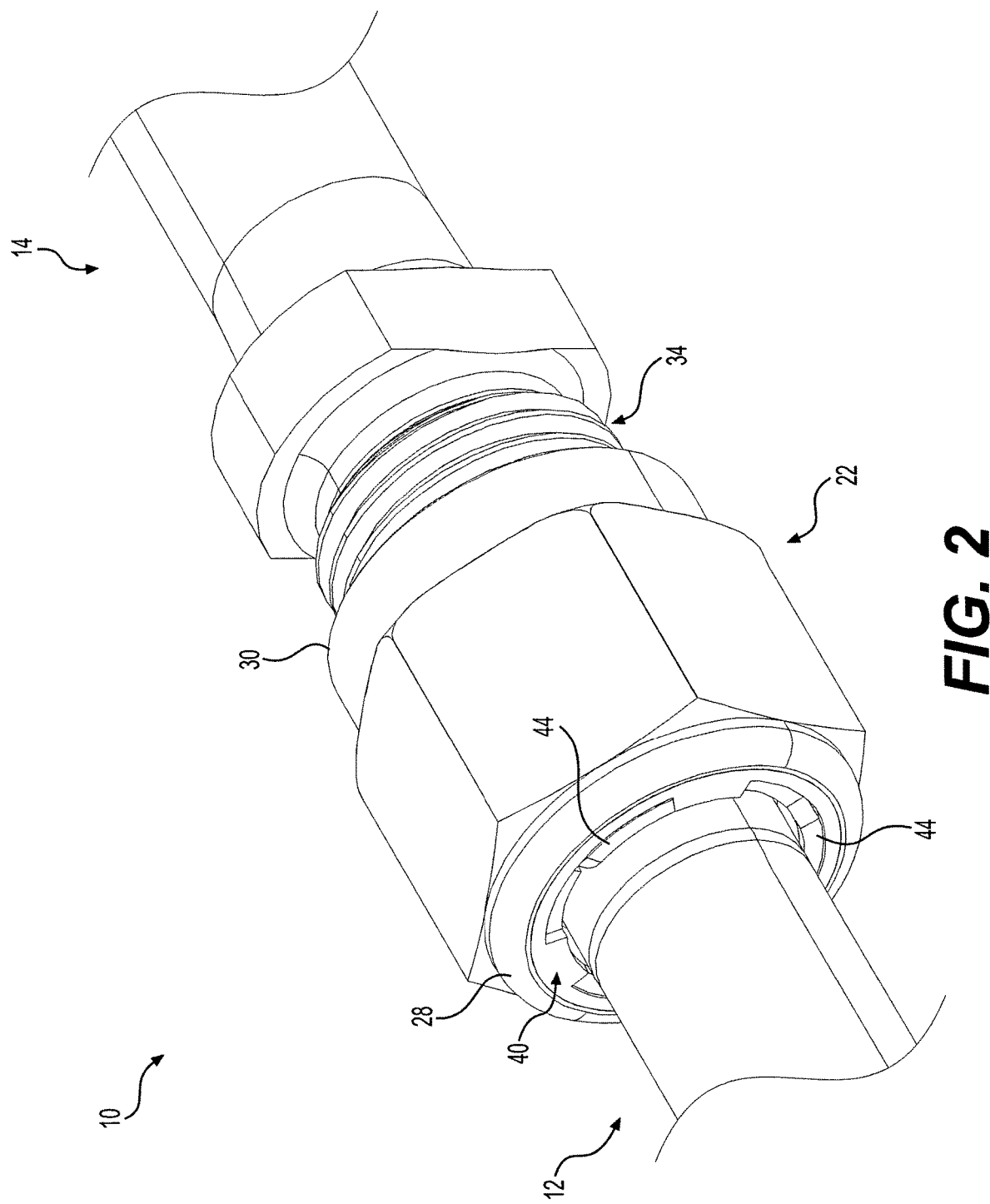
FIG. 2 is a perspective view of the assembled fitting of FIG. 1 in a first, untightened condition.
Figure 3:
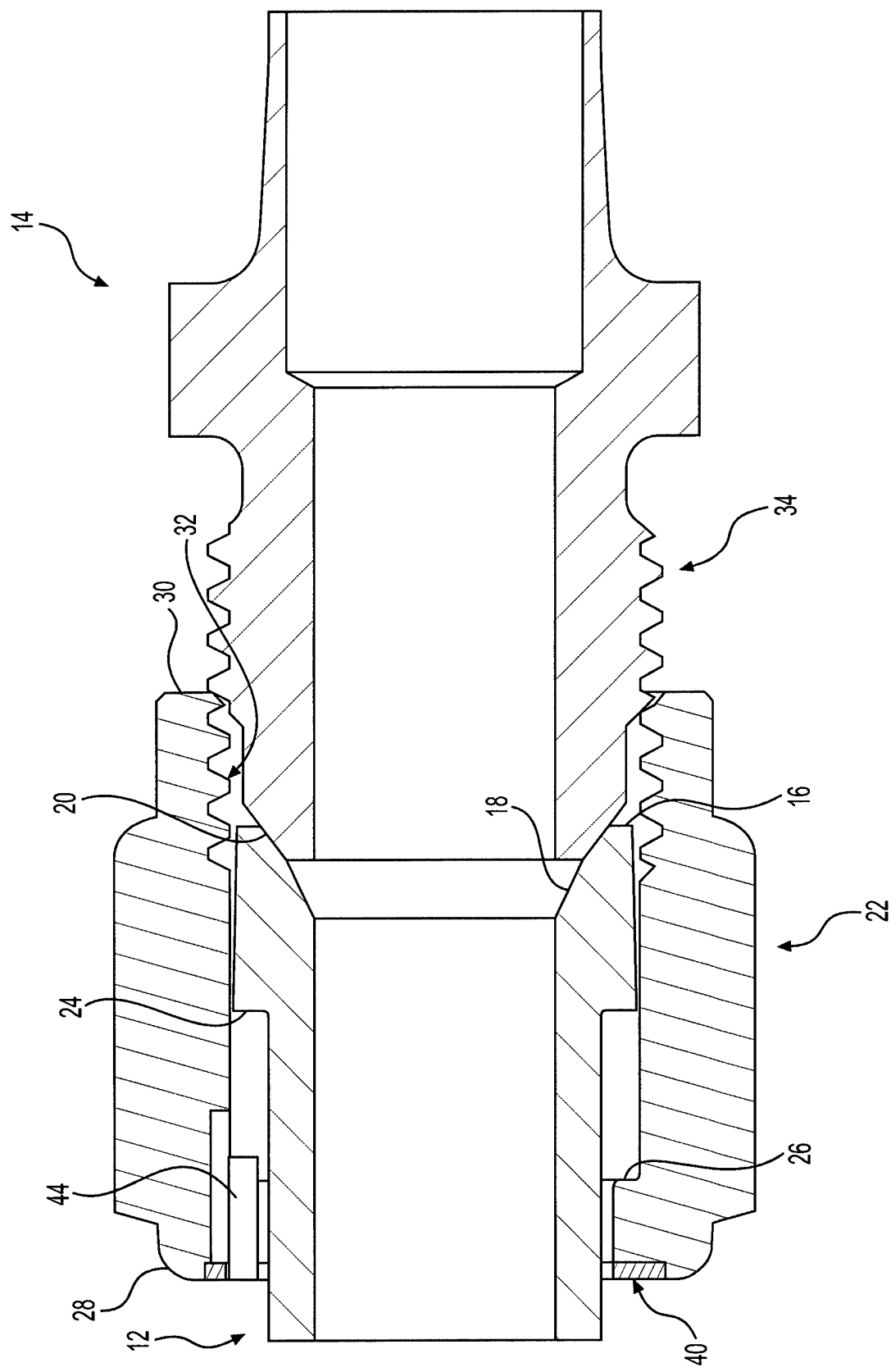
FIG. 3 is a cross-sectional view of the fitting of FIG. 2 in the first condition.
Figure 4:
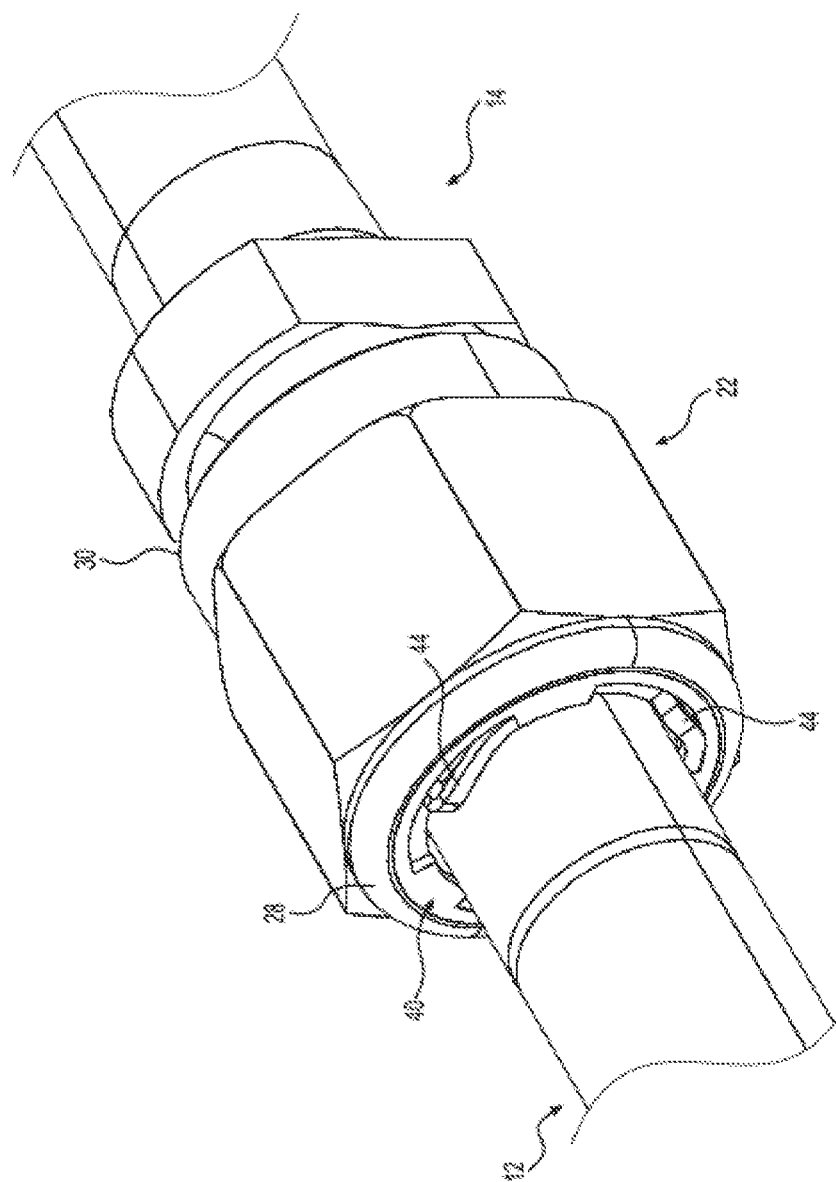
FIG. 4 is a perspective view of the assembled fitting of FIG. 1 in a second, fully-tightened condition.
Figure 5:
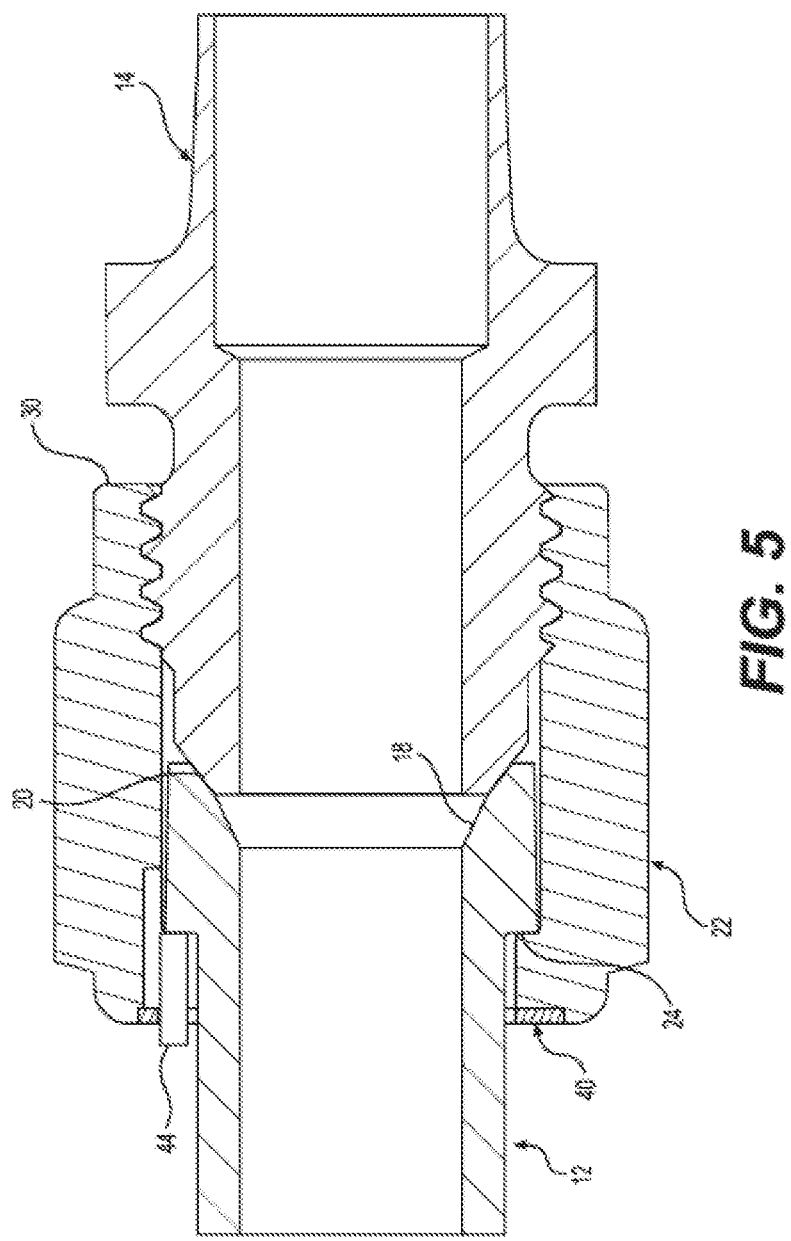
FIG. 5 is a cross-sectional view of the fitting of FIG. 4 in the second condition.

FIGS. 1-5 depict an exemplary fluid-tight fitting 10 for joining first and second fluid conduits 12, 14 in accordance with the present disclosure. The first conduit 12 has a first, distal end 16 with a conically flared inner diameter 18 which engages a correspondingly tapered distal end 20 of the second conduit 14 in an assembled condition of the fitting 10. The first conduit 12 extends through a nut 22 and includes a radially outwardly extending shoulder 24 that engages a corresponding shoulder 26 disposed within the inner diameter at a first distal end 28 of the nut 22. The second distal end 30 of the nut 22 includes interior threads 32 configured to engage corresponding exterior threads 34 on the second conduit 14 when the second conduit 14 is received in the second end 30 of the nut 22. The nut 22 is threadably screwed onto the second conduit 14 toward a tightened condition wherein the radially outwardly extending shoulder 24 on the first conduit 12 contacts the inner shoulder 26 of the nut 22, and the flared inner diameter 18 of the first conduit 12 sealingly engages the tapered end 20 of the second conduit 14 to create a fluid-tight assembly.

With continued reference to FIGS. 1-5, a first embodiment of an exemplary nut 22 in accordance with the principles of the present disclosure will be described. The nut 22 includes a visual indicator 40 received on the first end 28 of the nut 22 for indicating that the fluid-tight fitting 10 is securely in the tightened condition. In accordance with the principles of the present disclosure, the visual indicator 40 has a first condition wherein an indicating portion of the visual indicator 40 is hidden from view relative to the exterior of the nut 22 when the fitting 10 is not in the tightened condition, and a second condition wherein the indicating portion of the visual indicator 40 is visible from the exterior of the nut 22 when the fitting 10 is in the fully tightened condition.

In this embodiment, the visual indicator 40 comprises an annular ring 42 sized to be received on the first end 28 of the nut 22 and at least one leg 44 extending axially outwardly from the ring 42 to be received within the interior of the nut 22. As shown and described herein, the visual indicator 40 includes three legs 44 to facilitate observation of the legs 44 from various viewpoints around fitting 10, however, it will be appreciated that the visual indicator 40 may alternatively have only one leg 44, or may have any number of legs 44 as may be desired to facilitate visual observation. The inner surfaces of the nut 22 may include one or more slots 46 sized to receive the legs 44 when the ring 42 is received on the first end 28 of the nut 22. The ring 42 may be secured to the first end 28 of the nut 22 by any suitable method such as by adhesive, friction fitting, welding, mechanical interlock, or by the use of a retaining ring, as non-limiting examples.

At least the legs 44 of the visual indicator 40 may be formed from a flexible material such that the legs 44 may be deflected within the elastic range of the material without significant plastic deformation or permanent set in order to provide a visual indication of a proper fully-tightened condition of the fitting 10. In use, the legs 44 come into contact with the shoulder 24 of the first conduit 12 as the nut 22 is screwed onto the second conduit 14. As screwing is continued toward the tightened condition of the fitting 10, the legs 44 begin to axially deflect along the slots 46 in a direction toward the first end 28 of the nut 22 until the legs 44 are finally visible when the fitting 10 achieves the fully tightened condition. At least portions of the legs 44 may be provided with a contrasting color or other visual effect to facilitate observation of the legs 44 in the second condition. The contrasting color or visual effect may be provided by paint, dye, or any other suitable treatment that facilitates visual observation of the legs 44 in the second condition. The ring 42 and/or legs 44 may be formed from any suitable material that exhibits good working characteristics in high temperature environments, such as those that may be experienced in aerospace applications, and which allows the legs 44 to deflect without significant plastic deformation. In one embodiment, the legs 44 and/or ring 42 may be formed from an iron-nickel-chromium alloy, such as Inconel®. The ring 42 and/or legs 44 of the visual indicator 40 in this embodiment may be formed by any suitable manufacturing process. In one embodiment, the ring 42 and/or legs 44 may be formed by wire cutting and bending processes, for example, to obtain the undeflected shape of the visual indicator 40.

Figure 6:
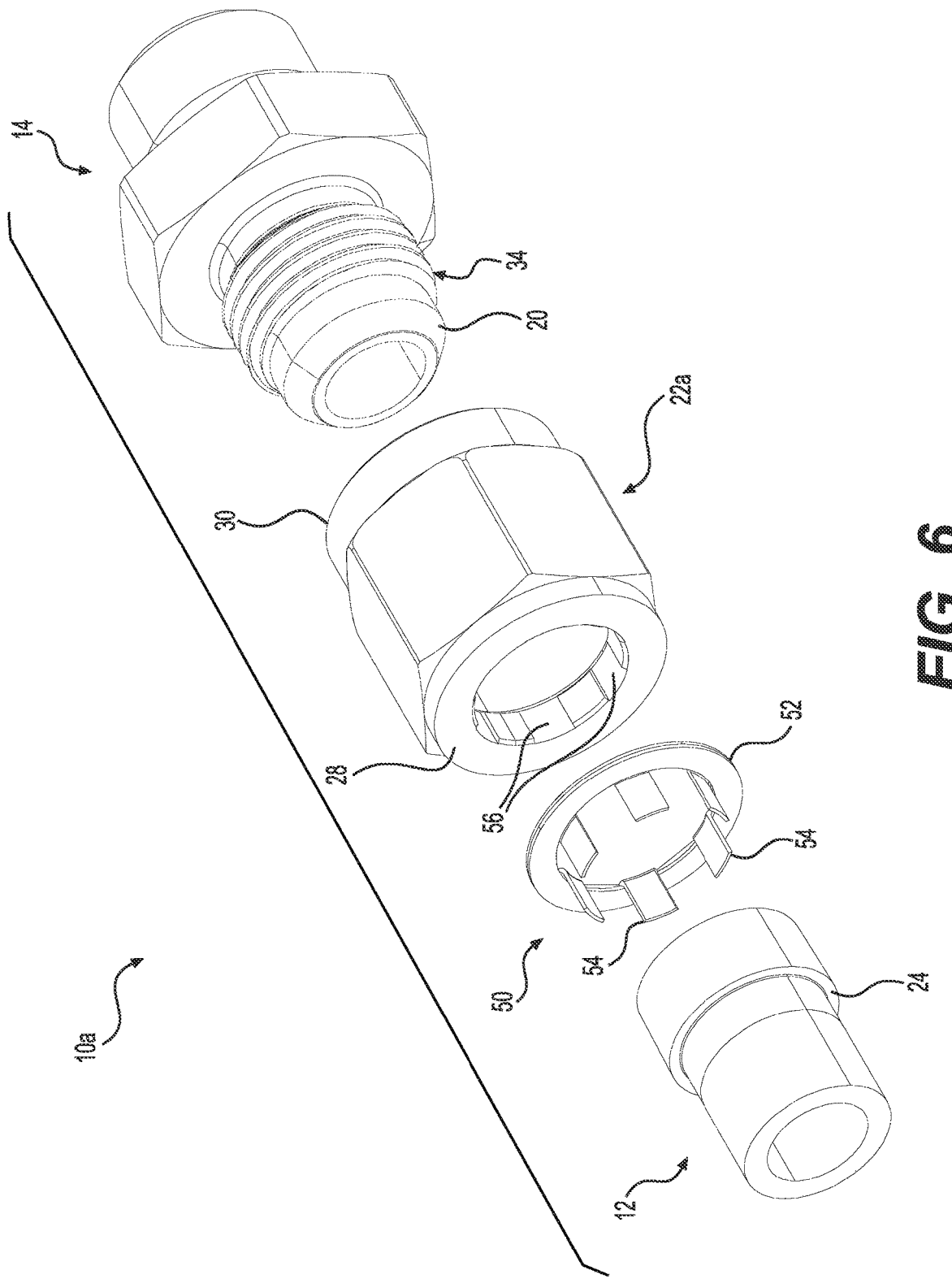
FIG. 6 is an exploded perspective view of a second exemplary embodiment of a fluid-tight fitting in accordance with the principles of the present disclosure.
Figure 7:
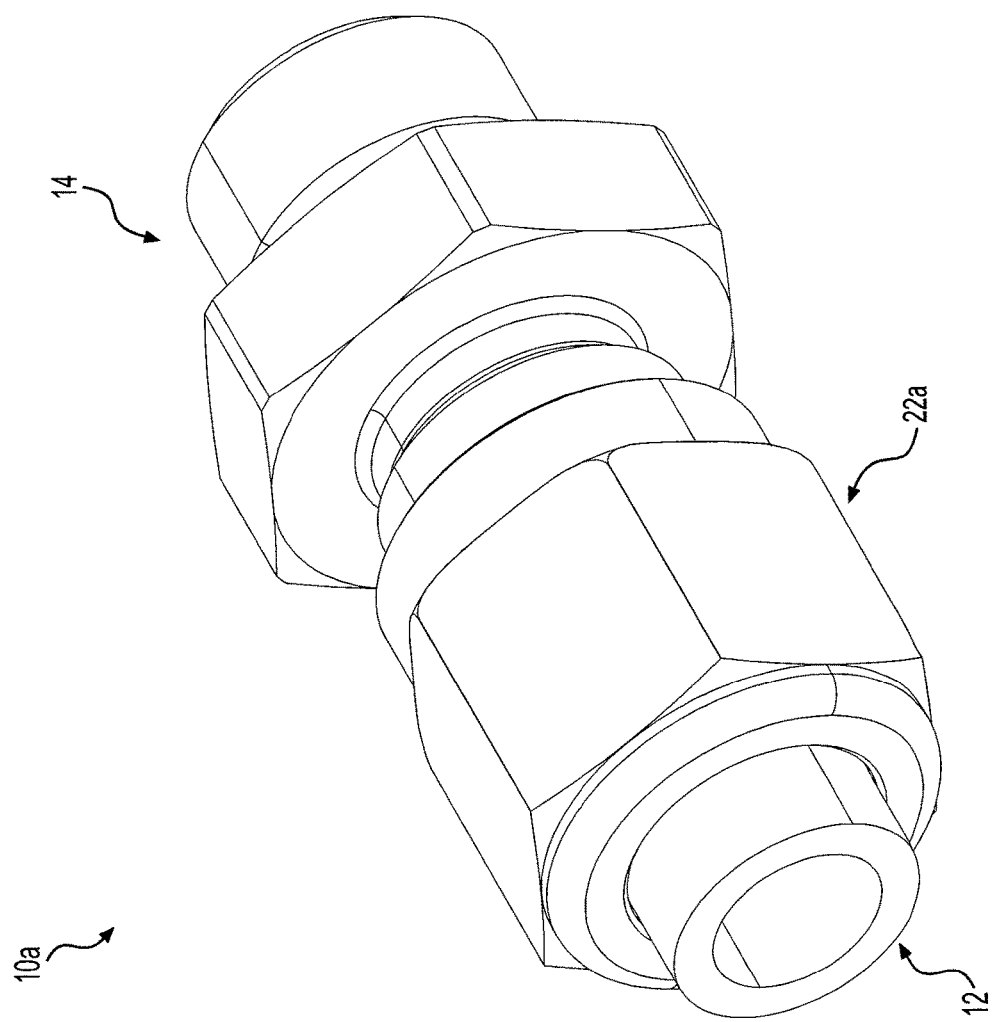
FIG. 7 is a perspective view of the assembled fitting of FIG. 6 in a first, untightened condition.
Figure 8:
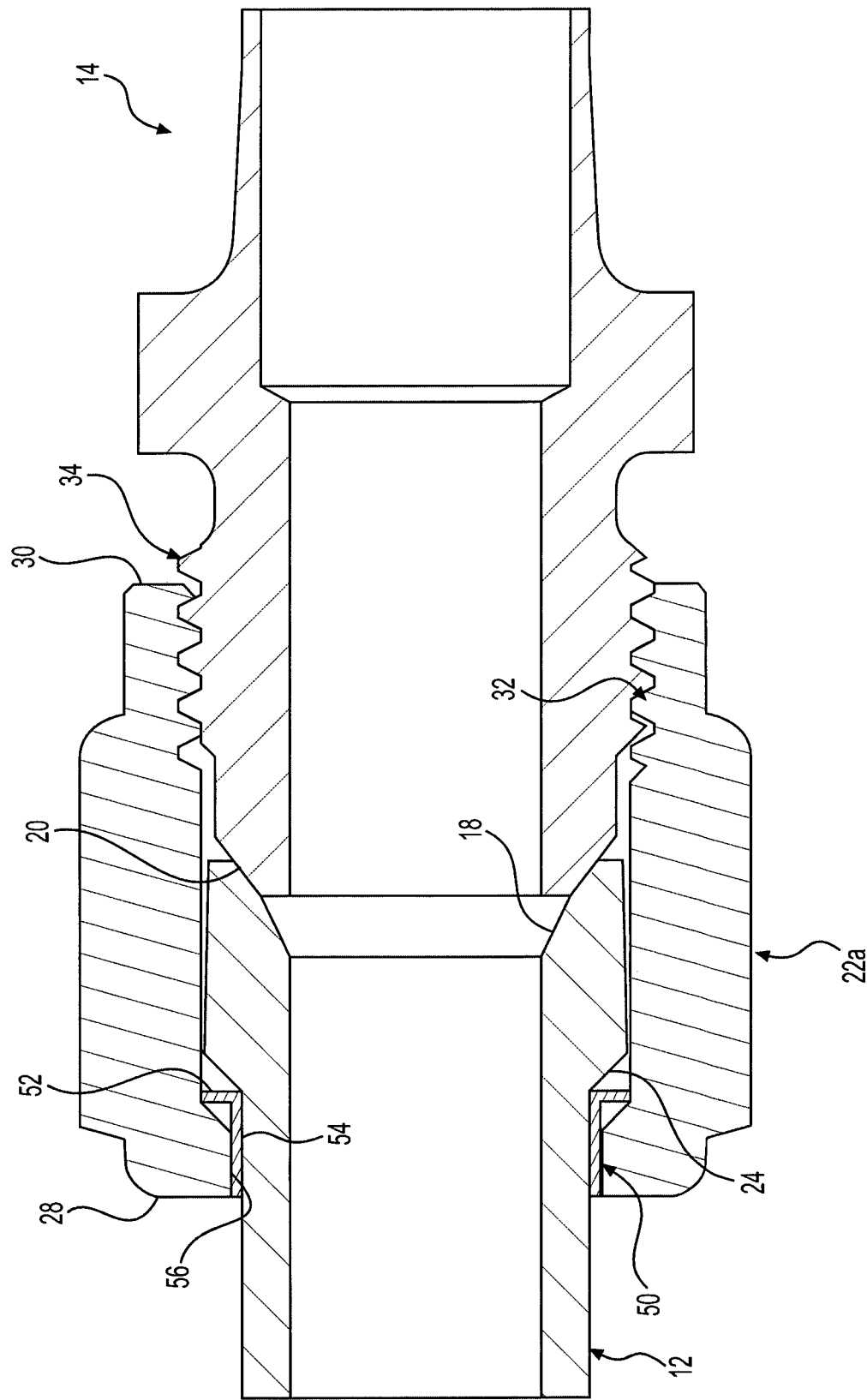
FIG. 8 is a cross-sectional view of the fitting of FIG. 7 in the first condition.
Figure 9:
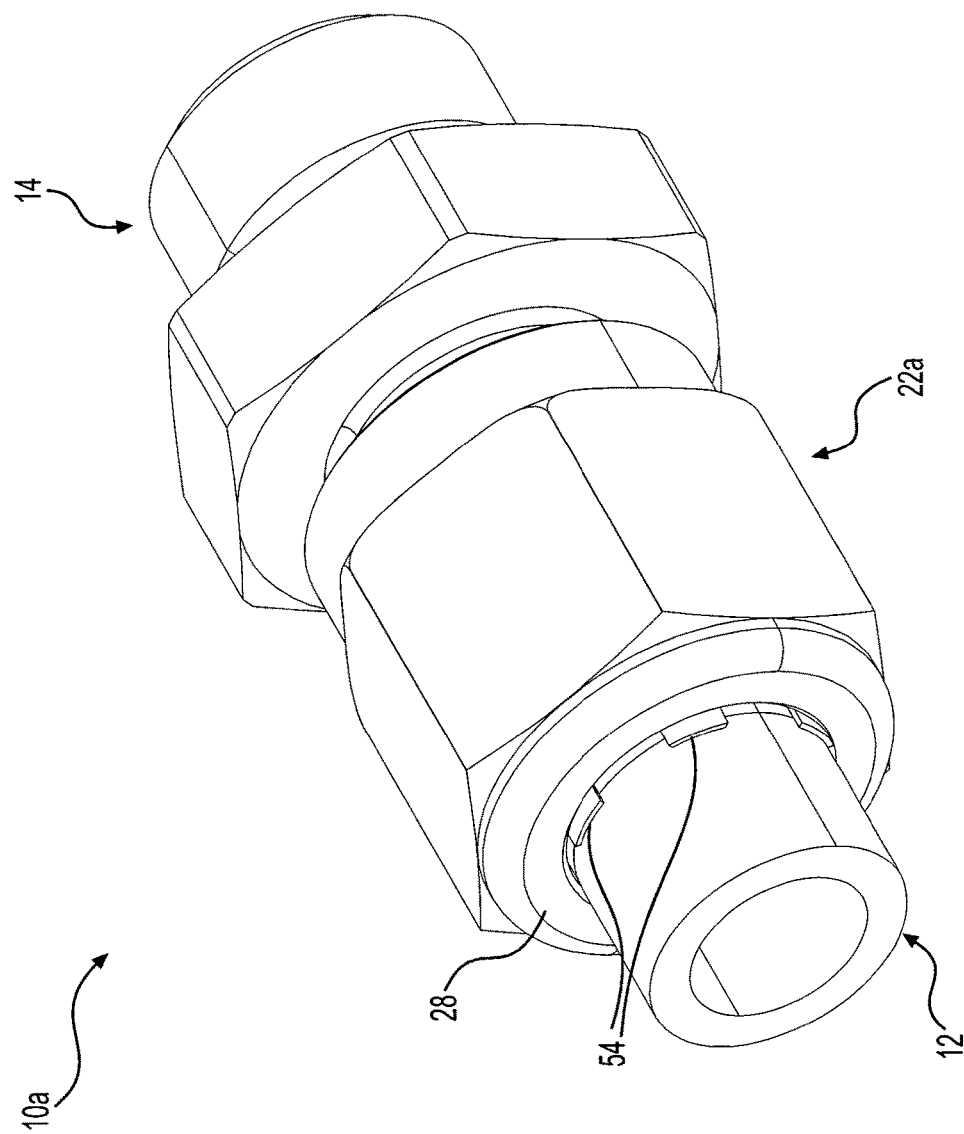
FIG. 9 is a perspective view of the assembled fitting of FIG. 6 in a second, fully-tightened condition.
Figure 10:
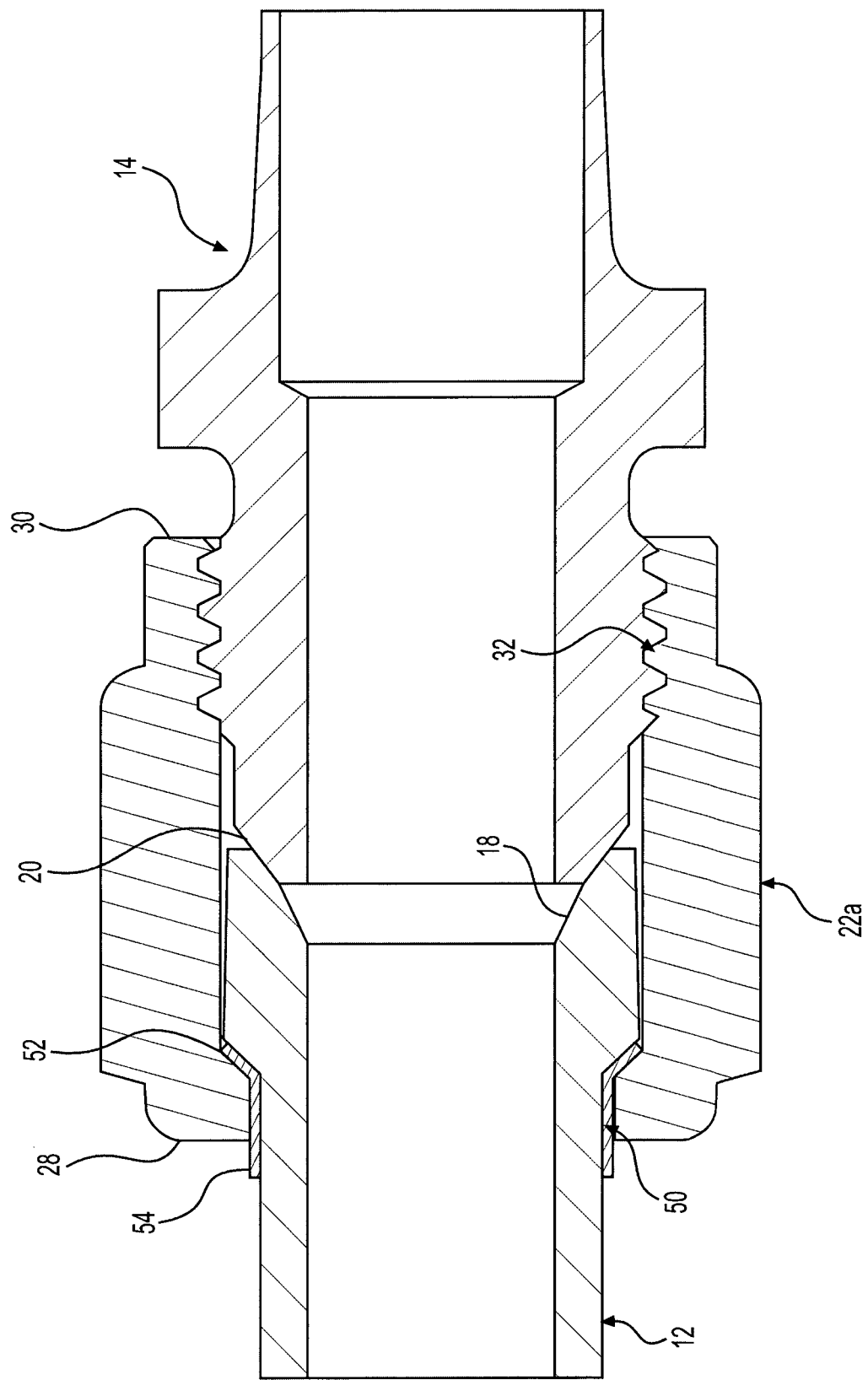
FIG. 10 is a cross-sectional view of the fitting of FIG. 9 in the second condition.
Figure 10A:
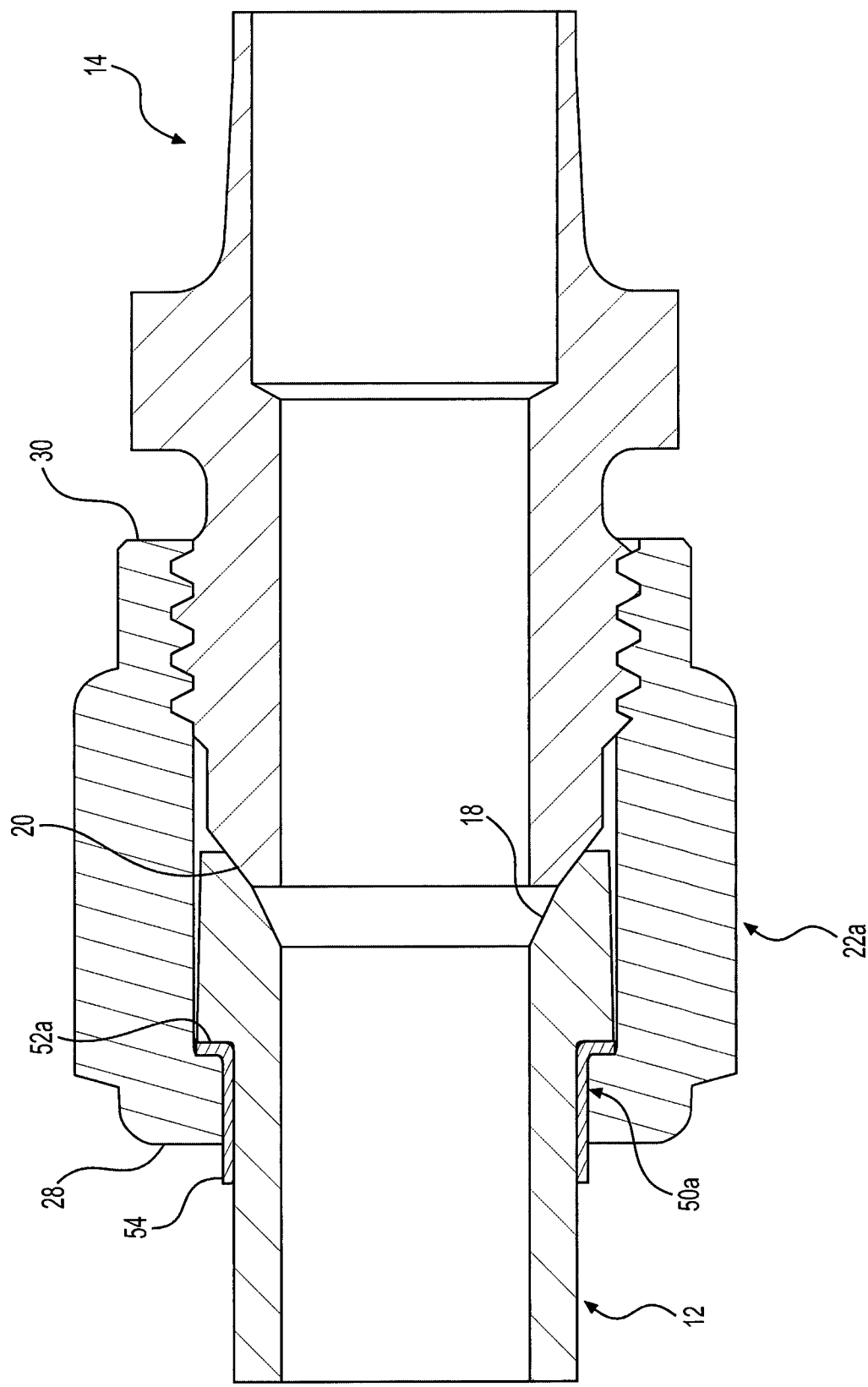
FIG. 10A is a cross-sectional view of the alternative embodiment of the fitting of FIG. 8A in the second condition.
Figure 12:
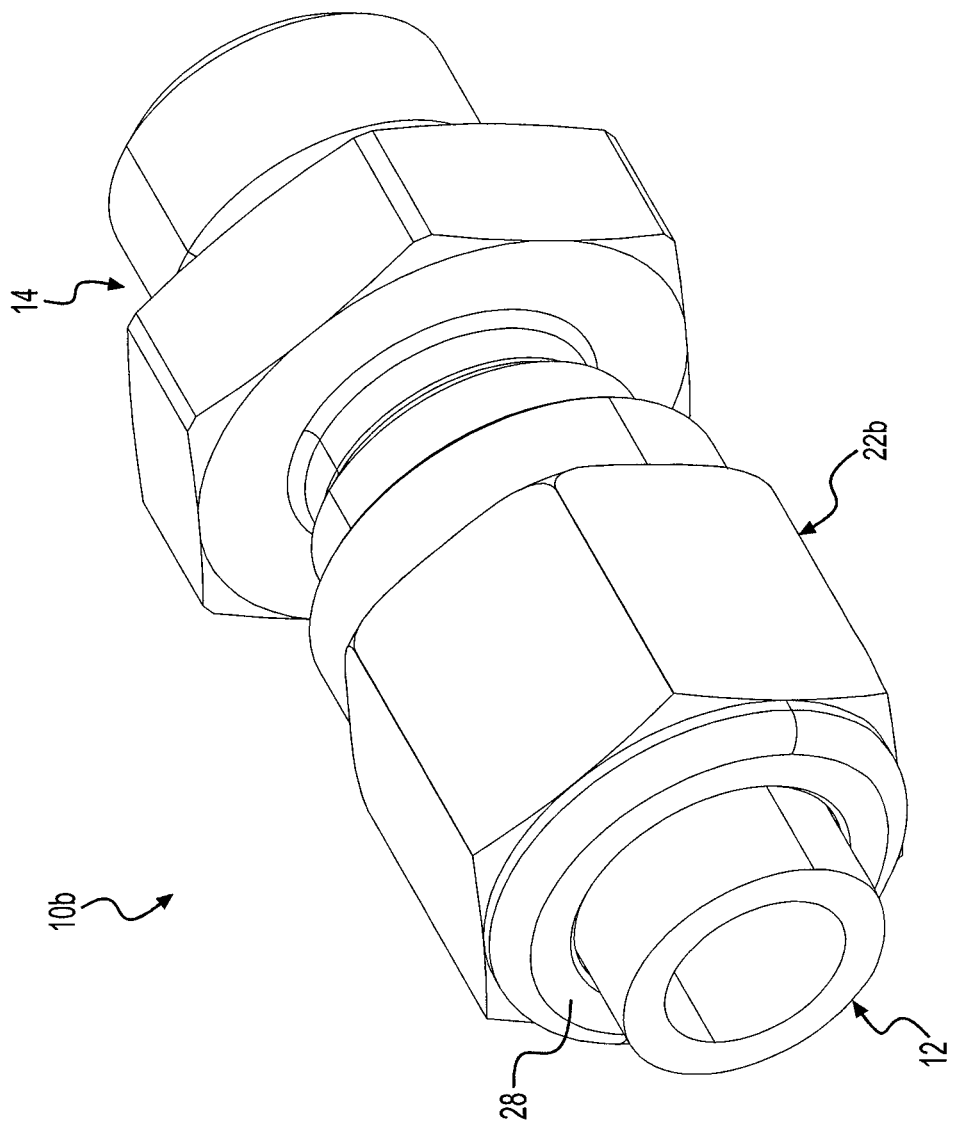
FIG. 12 is a perspective view of the assembled fitting of FIG. 11 in a first, untightened condition.
Figure 13:
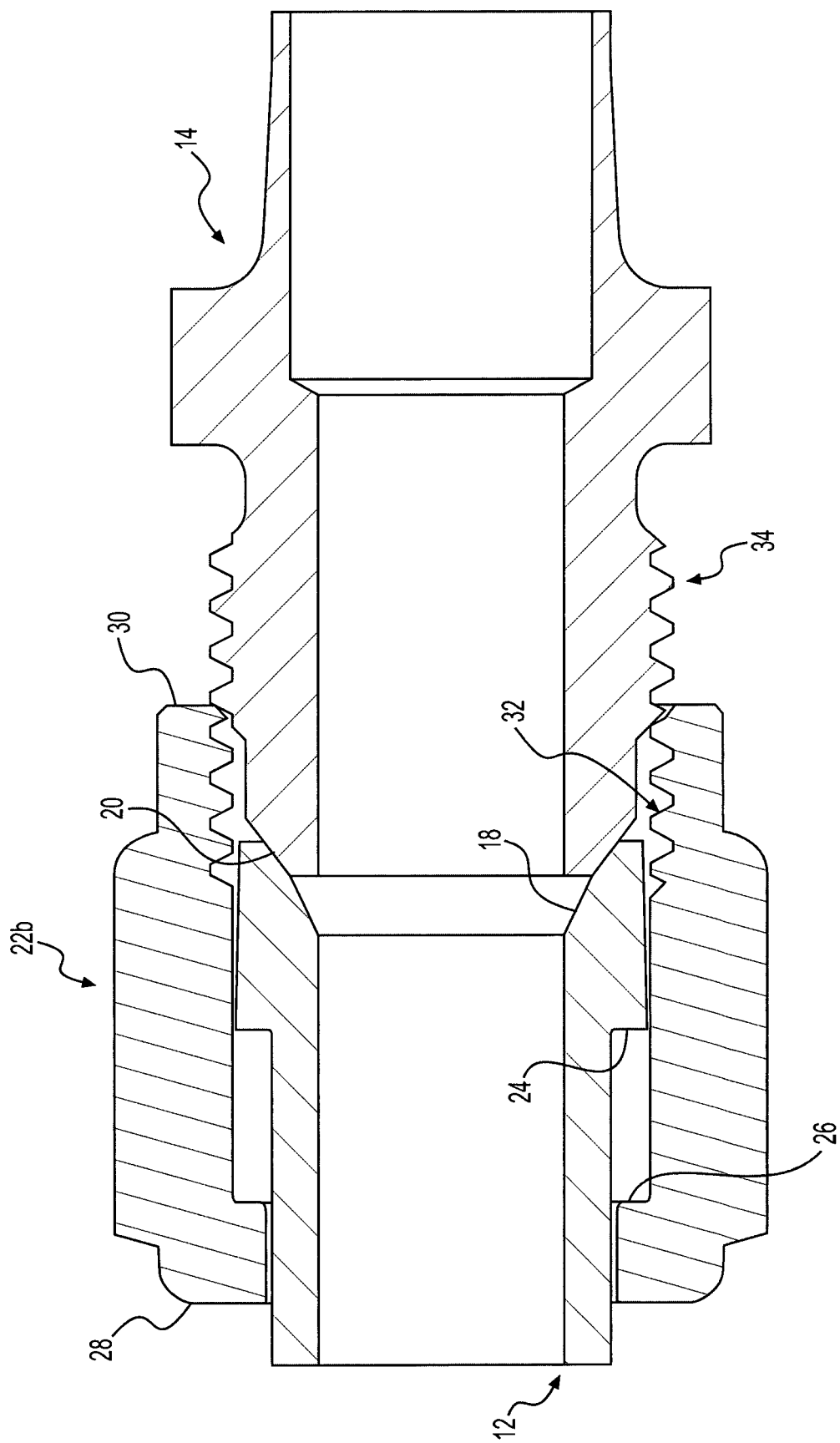
FIG. 13 is a cross-sectional view of the fitting of FIG. 12 in the first condition.
Figure 14:
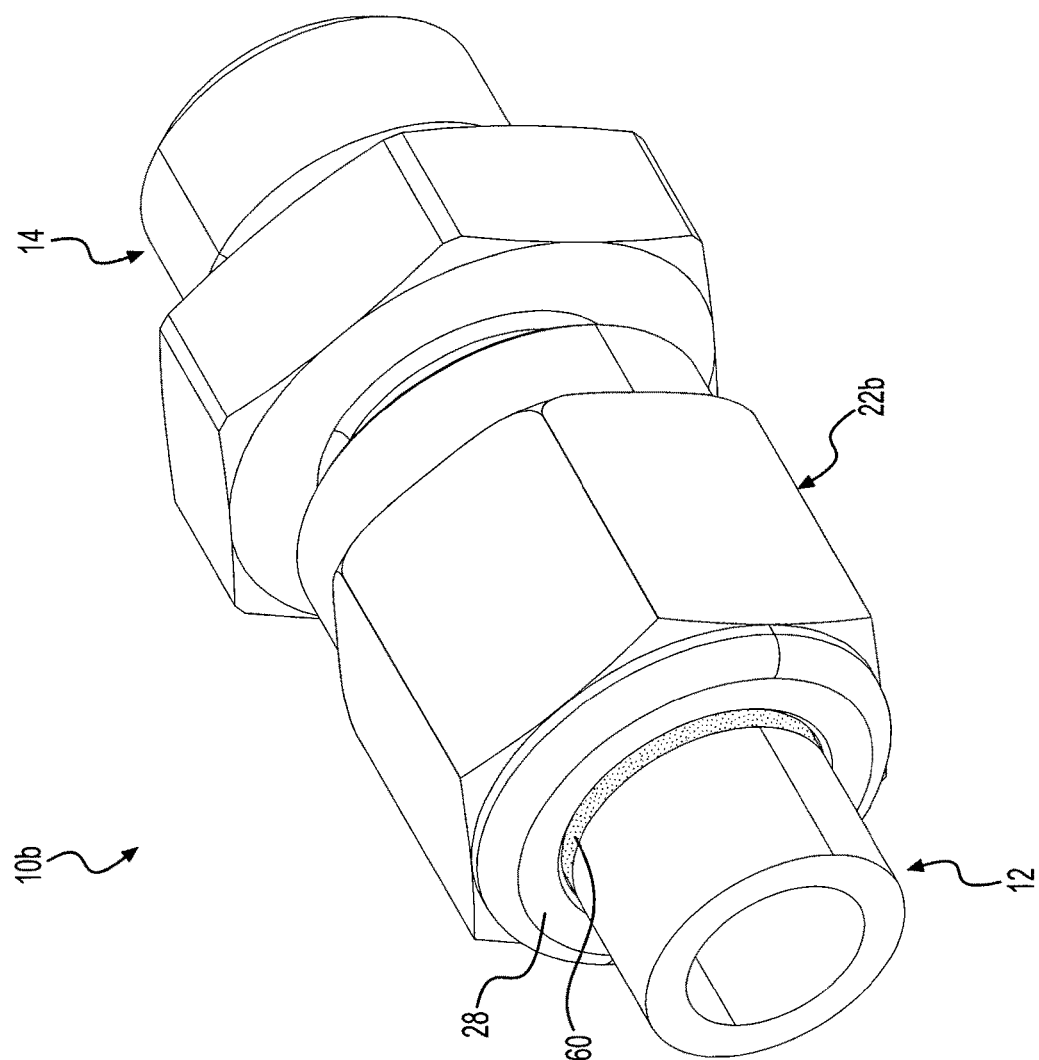
FIG. 14 is a perspective view of the assembled fitting of FIG. 11 in a second, fully-tightened condition.
Figure 15:
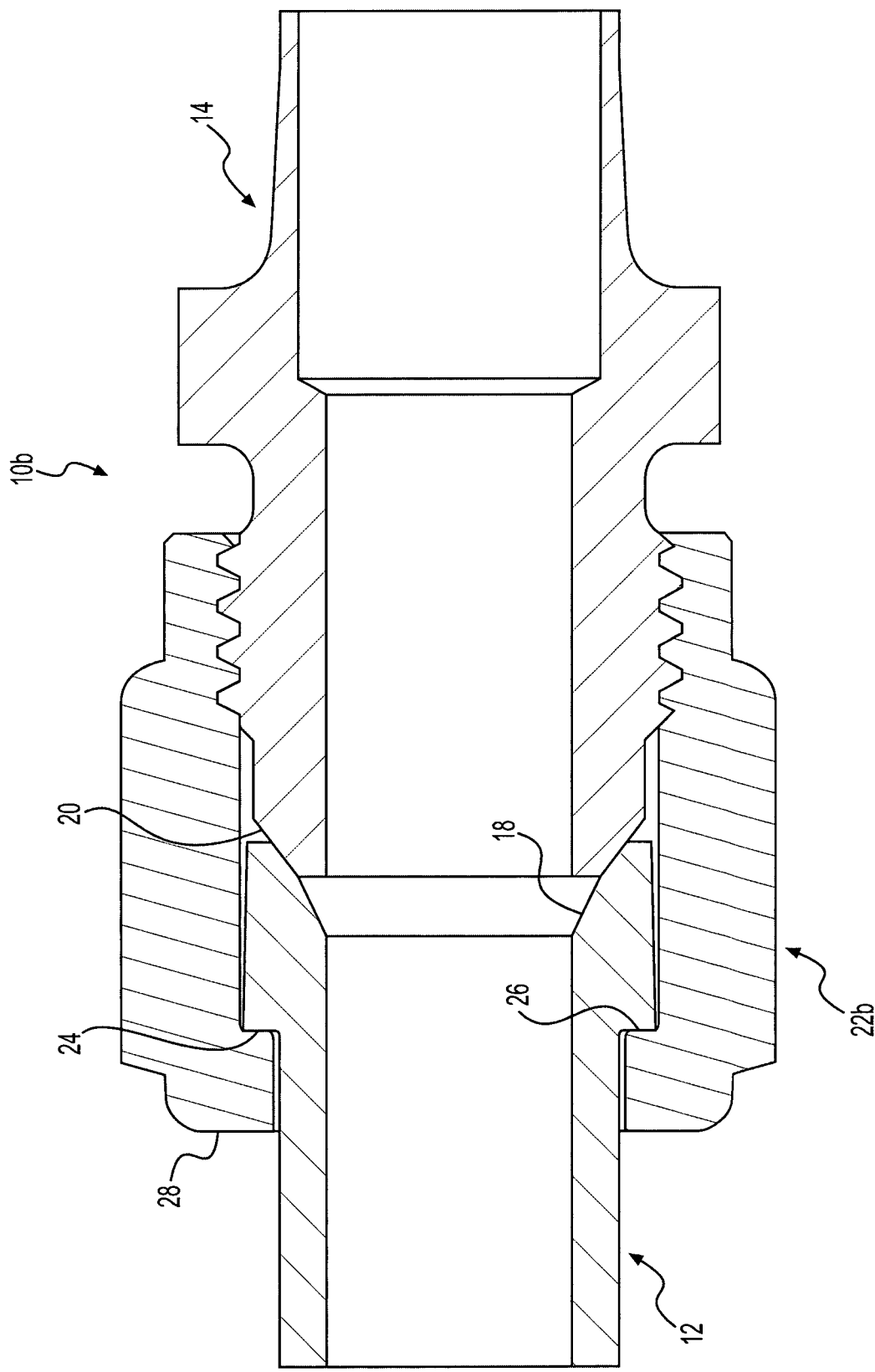
FIG. 15 is a cross-sectional view of the fitting of FIG. 14 in the second condition.
Figure 16:
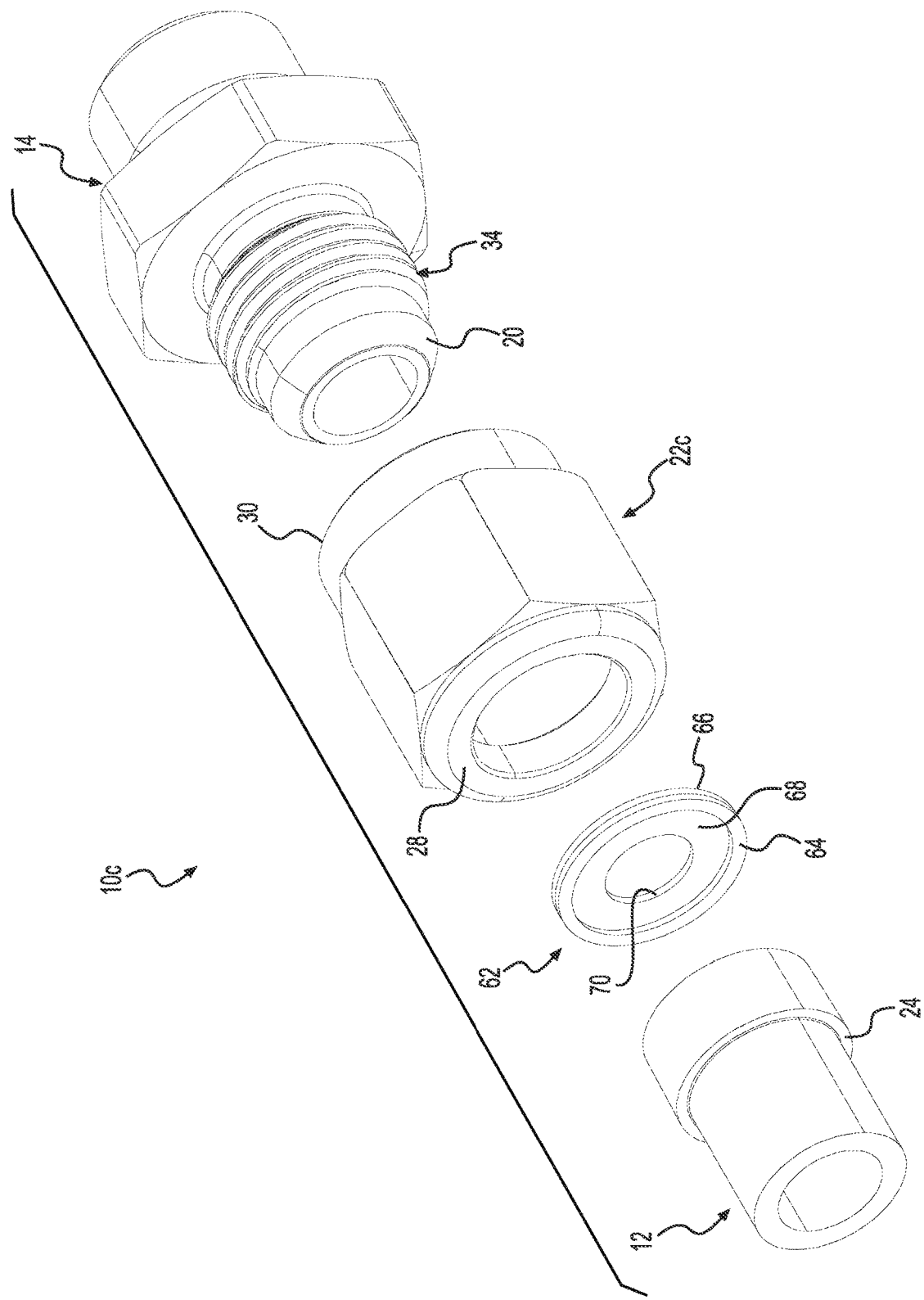
FIG. 16 is an exploded perspective view of a fourth exemplary embodiment of a fluid-tight fitting in accordance with the principles of the present disclosure.

A second embodiment of an exemplary fitting 10a in accordance with the principles of the present disclosure is shown and described with reference to FIGS. 6-10, wherein features similar to the embodiment described above are similarly numbered. In this embodiment, the visual indicator 50 comprises a spring washer 52, 52a received within the interior of the nut 22a from the open second end 30, and which engages the interior shoulder 26 proximate the first end 28 of the nut 22a. FIGS. 6, 8, and 10 illustrate an embodiment wherein the spring washer 52 has a generally flat undeflected shape, and FIGS. 8A and 10A illustrate an alternative embodiment of visual indicator 50a wherein the spring washer 52a has a conical undeflected shape, similar to a Belleville washer. In either configuration, one or more axially extending legs 54 are provided proximate the inner diameter of the spring washer 52, 52a and extend in a direction toward the distal first end 28 of the nut 22A. One or more slots 56 may be provided in the inner surface of the nut 22a to receive the one or more legs 54 of the visual indicator 50, 50a. During assembly of the fitting 10a the radially outwardly extending shoulder 24 of the first conduit 12 begins to engage the spring washer 52, 52a as the nut 22a is screwed onto the second conduit 14 in a direction toward the tightened condition of the fitting 10a, as depicted in FIGS. 7, 8, and 8A. As the spring washer deflects by engagement with the first conduit 12, the legs 54 move axially along the slots 56 toward the open first end 28 of the nut 22a until the distal ends of the legs 54 become visible when viewed from the exterior of the nut 22a in the fully tightened condition of the fitting 10a, as depicted in FIGS. 9, 10, and 10A.

The spring washer 52, 52a may be formed from any suitable material that exhibits good working characteristics in high temperature environments, such as those that may be experienced in aerospace applications, and which allows the spring washer 52, 52a to deflect toward the second condition without significant plastic deformation. The legs 54 of the visual indicator 50, 50a may include a contrasting color or visual effect provided at least on a portion thereof to facilitate ready visual observation in the second, tightened condition of the fitting 10a. As discussed above, such suitable contrasting color or visual effect may be provided by painting, dying, or any other suitable treatment of the material that facilitates visual observation.

FIGS. 11-15, depict a third embodiment of a fluid-tight fitting 10b wherein a visual indication is provided when the fitting 10b is in the fully tightened condition. In this embodiment, the visual indicator comprises a discrete marker 60 disposed on the outer circumferential surface of the first conduit 12 (represented by the stippled area). The marker 60 is positioned axially along the first conduit 12 such that the marker becomes visible when viewed from the exterior of the nut 22b when the fitting 10b attains the fully tightened condition. The marker may comprise a contrasting color or other visual effect suitable to facilitate ready observation of the marker in the fully tightened condition of the fitting 10b.

Figure 17:
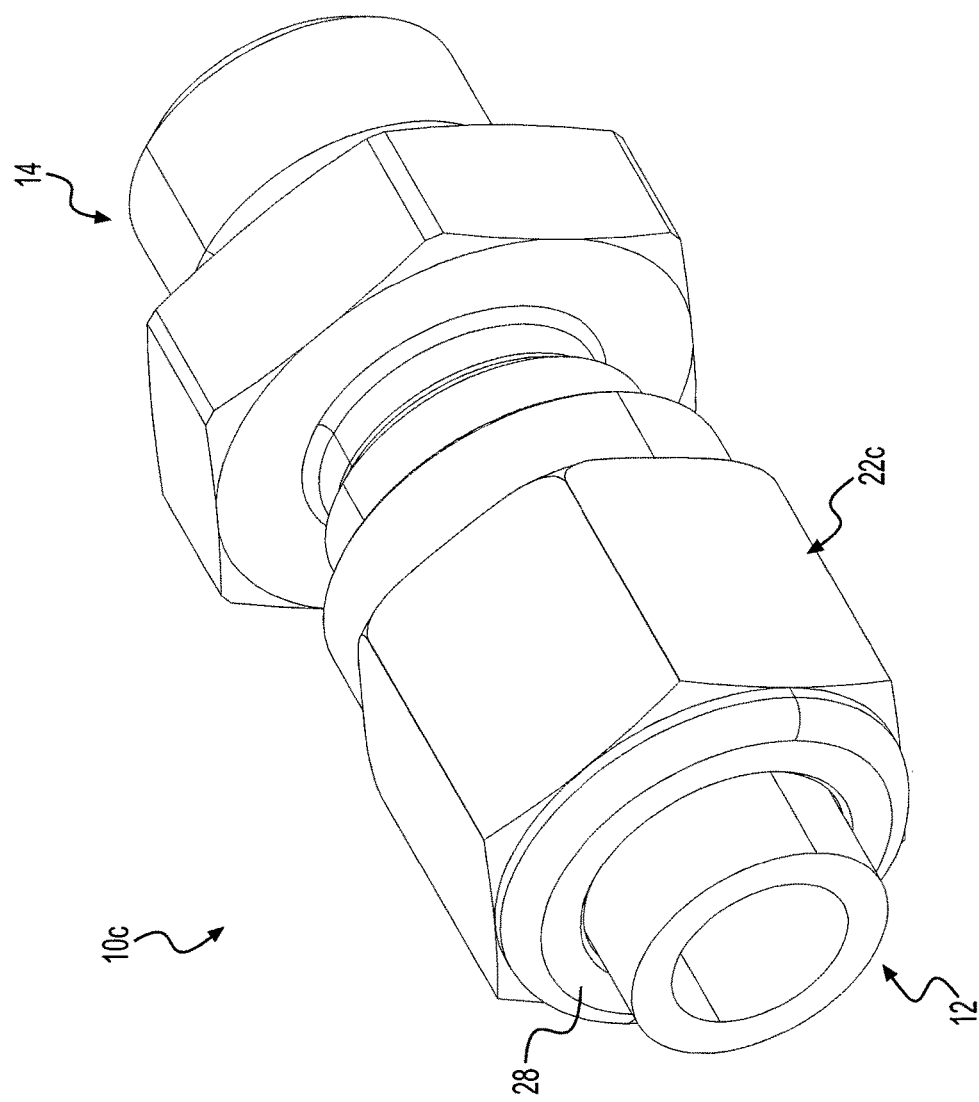
FIG. 17 is a perspective view of the assembled fitting of FIG. 16 in a first, untightened condition.
Figure 18:
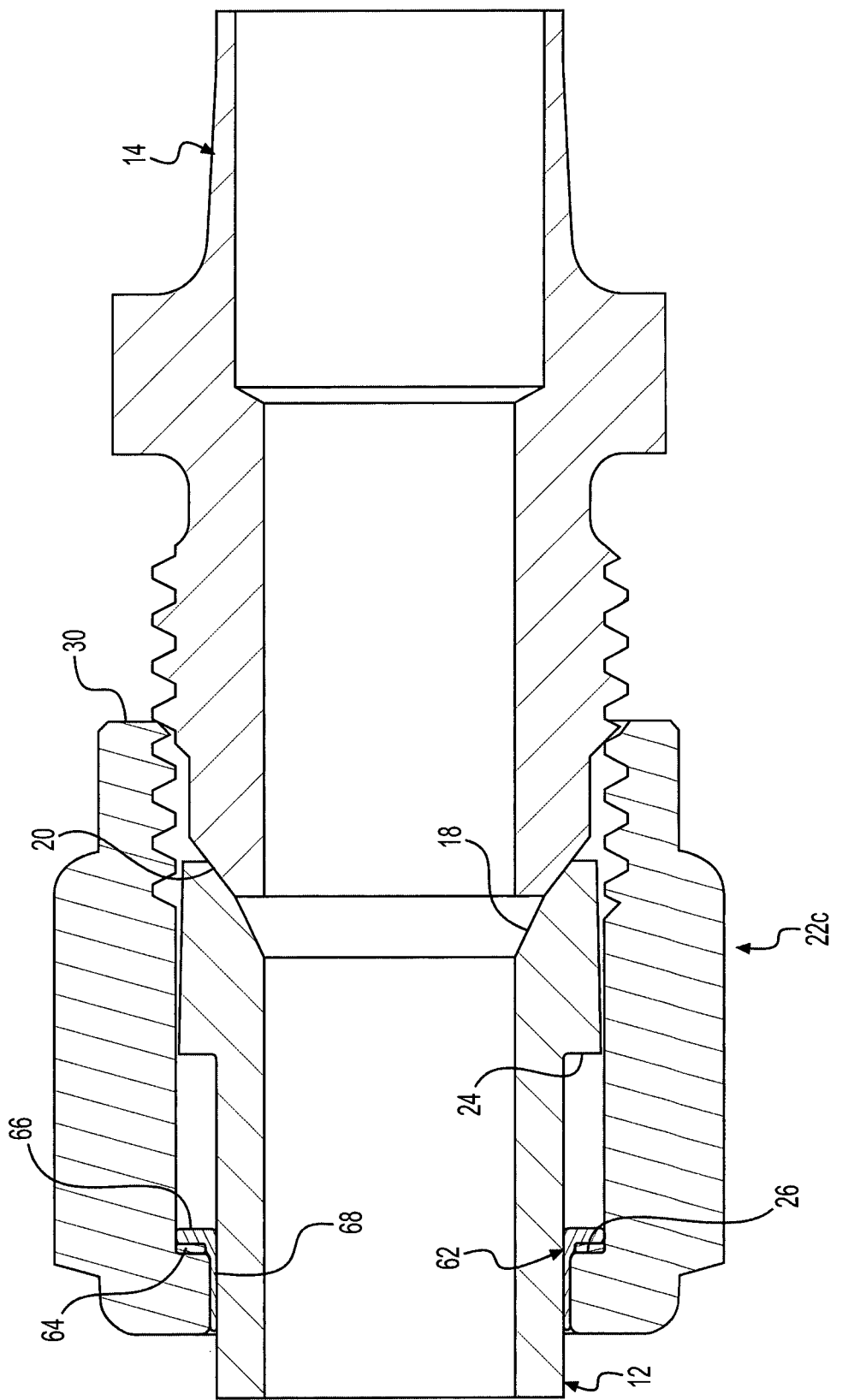
FIG. 18 is a cross-sectional view of the fitting of FIG. 17 in the first condition.
Figure 19:
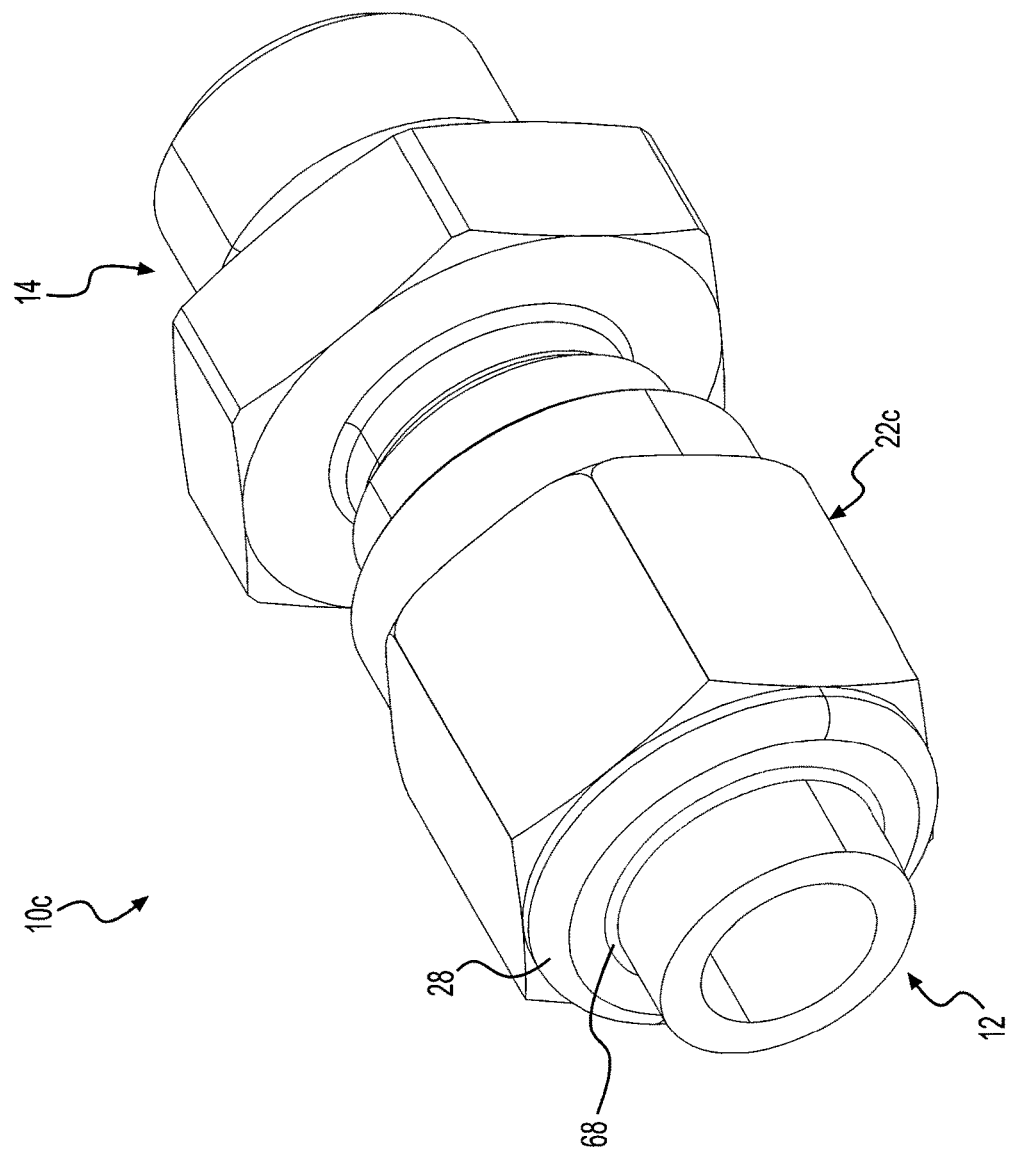
FIG. 19 is a perspective view of the assembled fitting of FIG. 16 in a second, fully-tightened condition.
Figure 20:
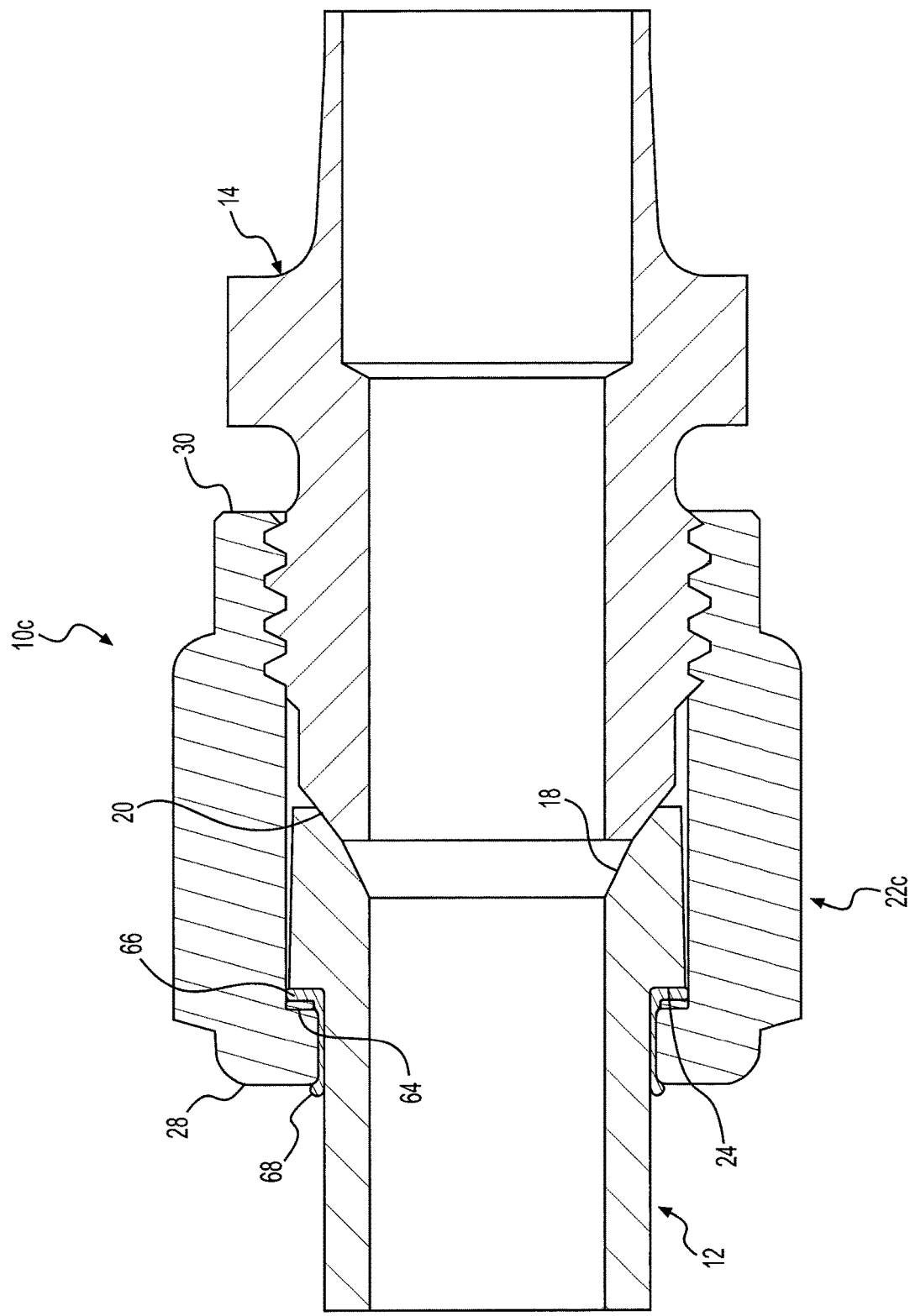
FIG. 20 is a cross-sectional view of the fitting of FIG. 19 in the second condition.
Figure 21:
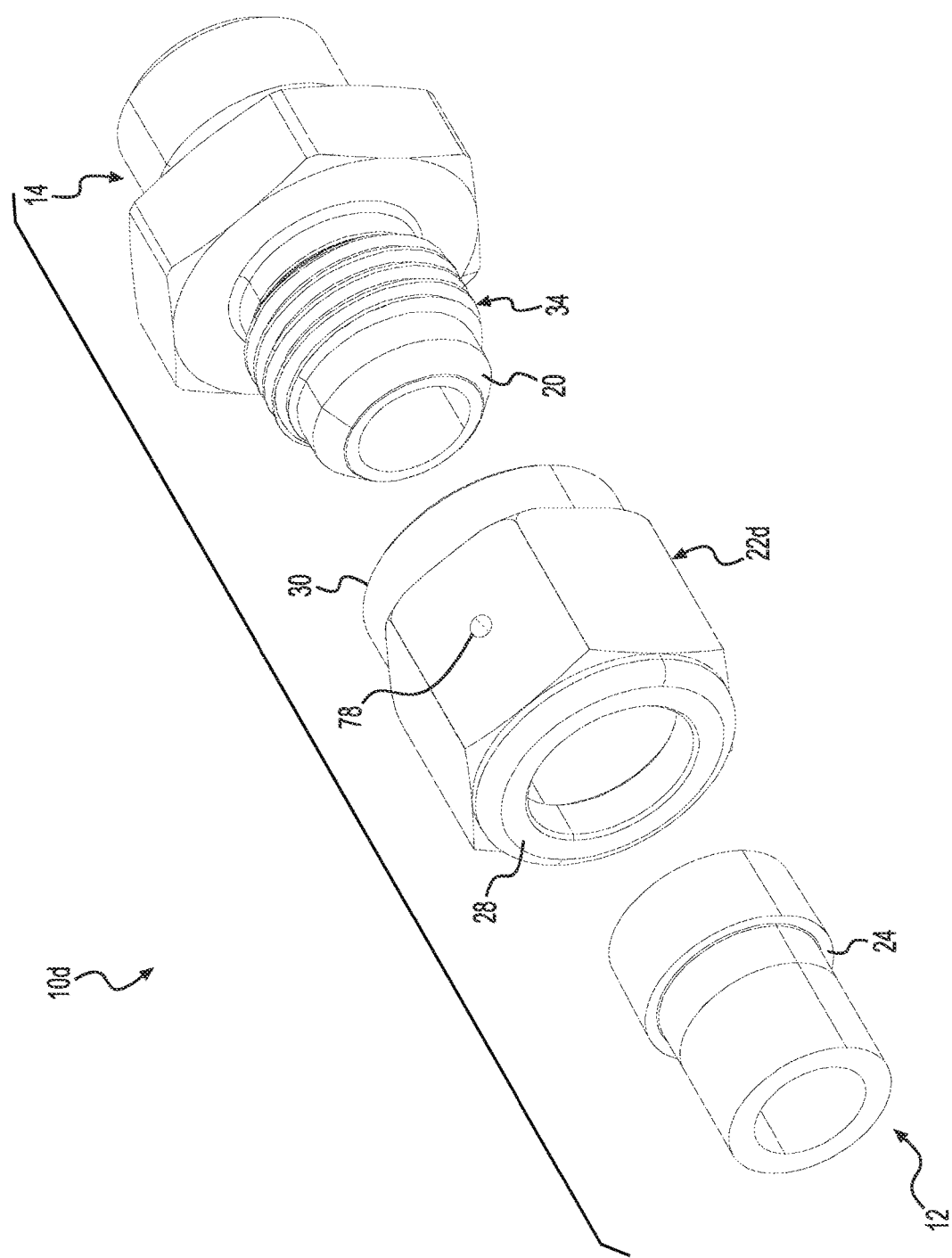
FIG. 21 is an exploded perspective view of a fifth exemplary embodiment of a fluid-tight fitting in accordance with the principles of the present disclosure.
Figure 22:
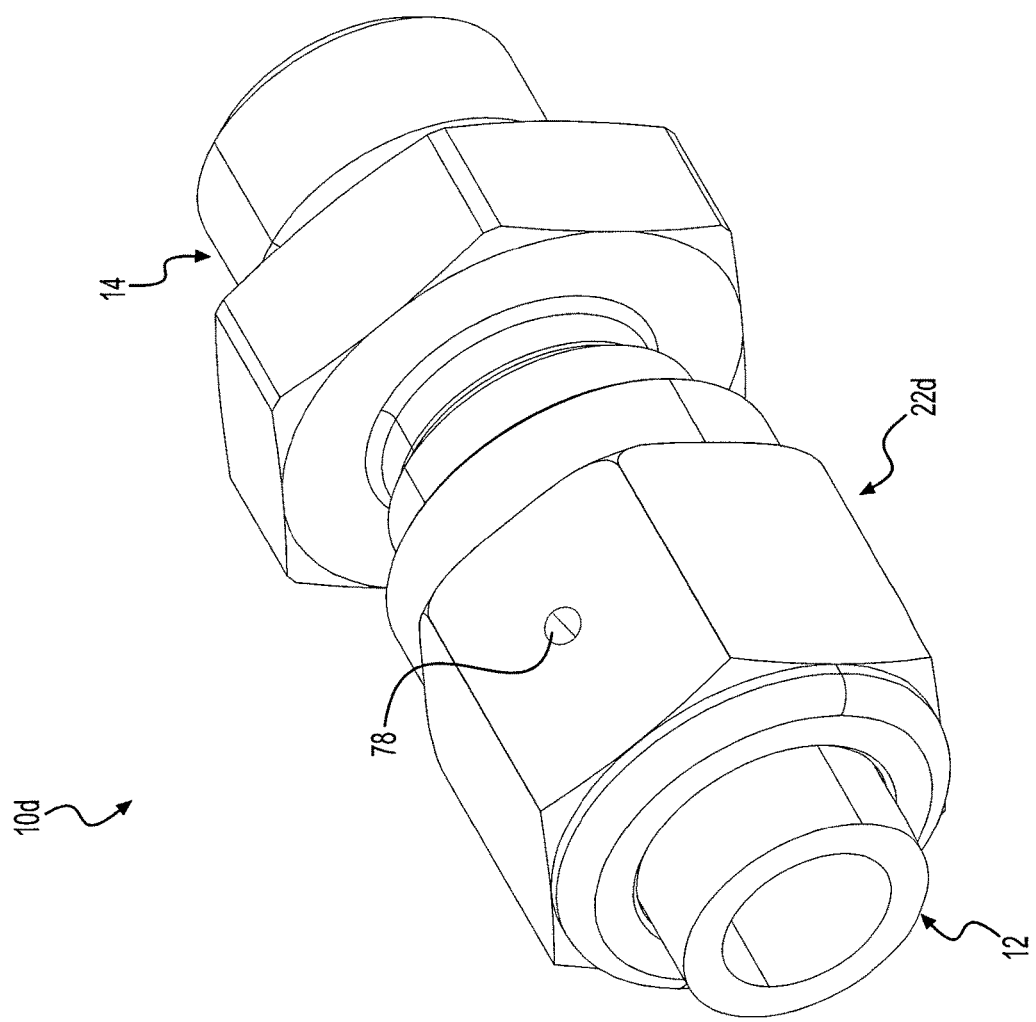
FIG. 22 is a perspective view of the assembled fitting of FIG. 21 in a first, untightened condition.
Figure 23:
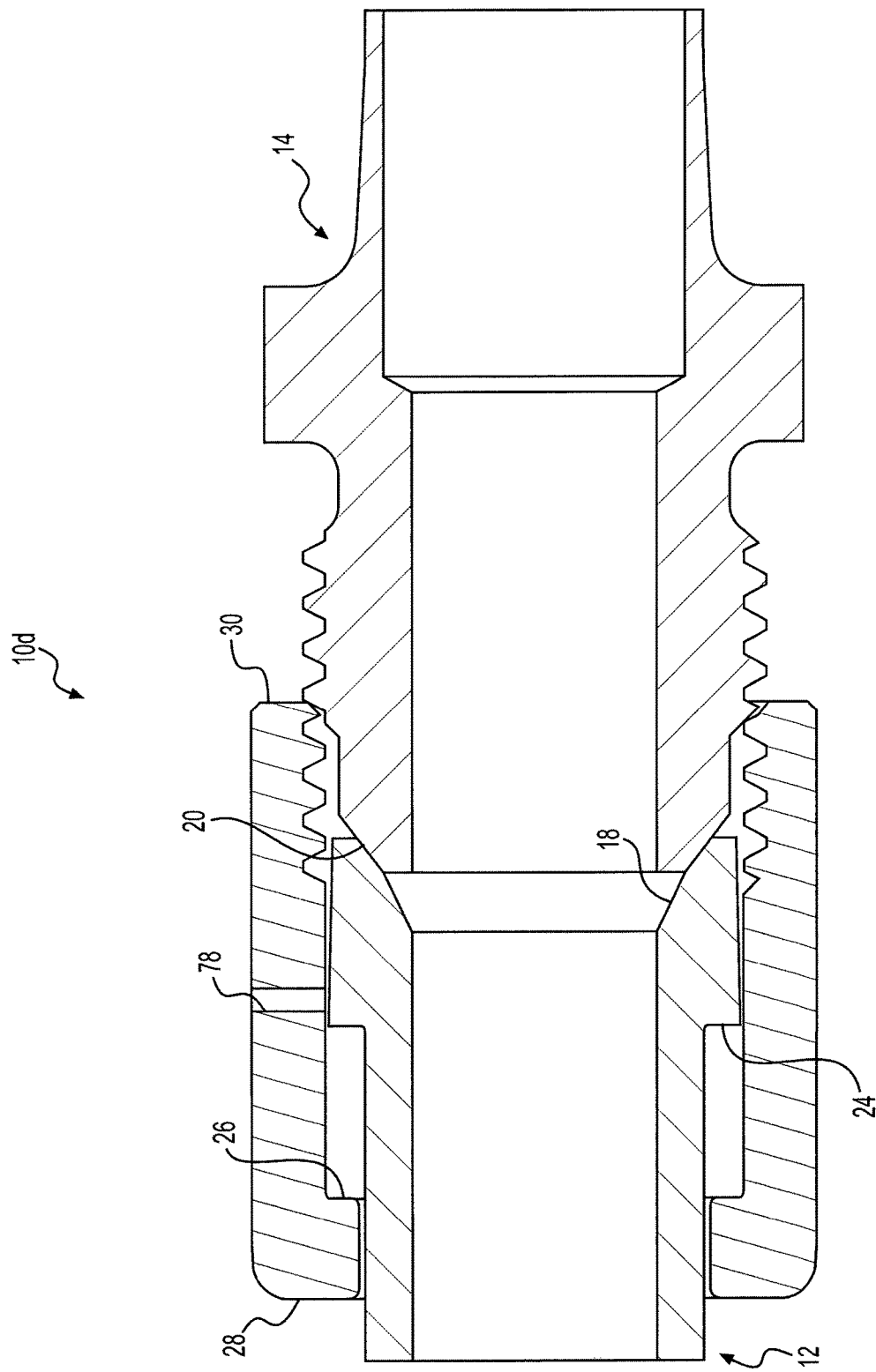
FIG. 23 is a cross-sectional view of the fitting of FIG. 22 in the first condition.
Figure 24:
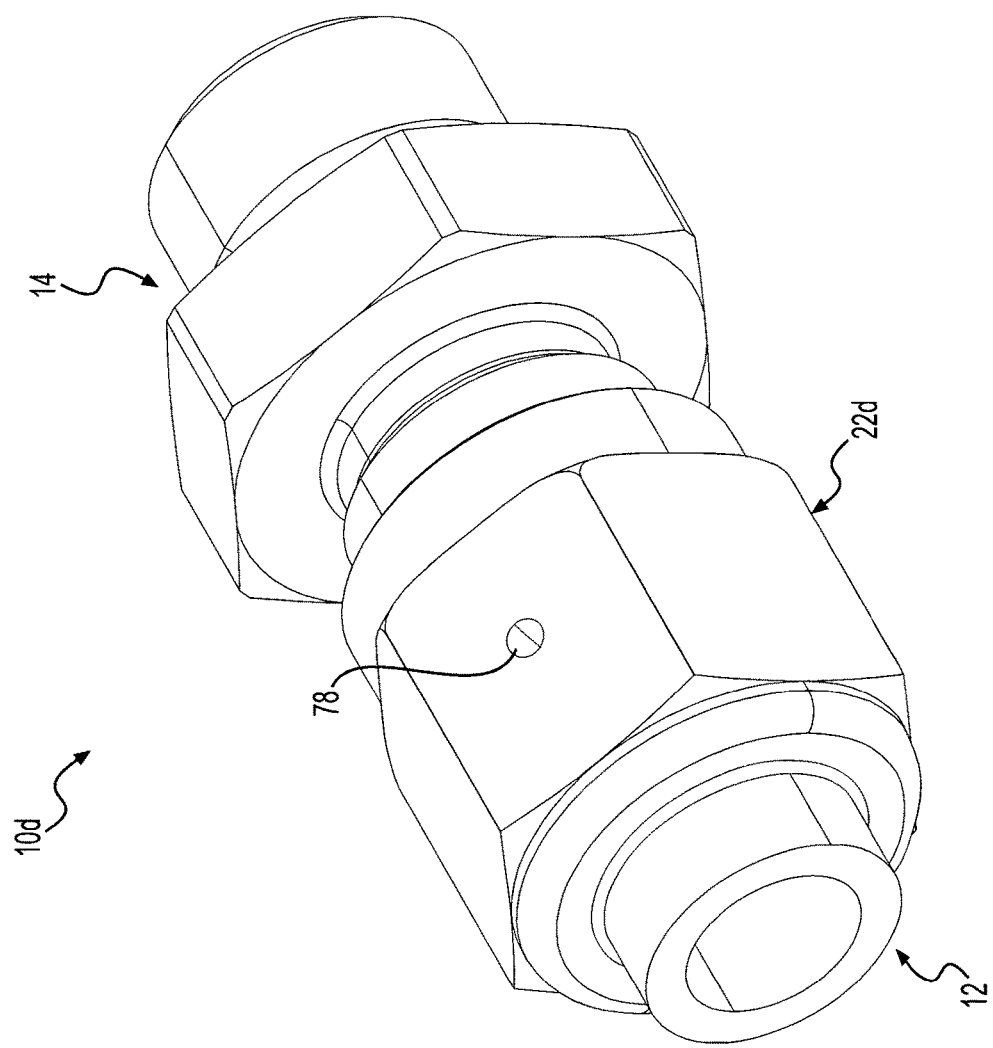
FIG. 24 is a perspective view of the assembled fitting of FIG. 21 in a second, fully-tightened condition.

Referring now to FIGS. 16-20, a fourth embodiment of an exemplary fitting 10c in accordance with the principles of the present disclosure is described. In this embodiment, the visual indicator 62 comprises an annular ring 64 received within the interior of the nut 22c, and configured to engage the interior shoulder 26 proximate the first end 28 of the nut 22c. The visual indicator 62 further includes an elastomeric indicator portion 66 disposed on the annular ring 64 and having a central portion 68 extending radially inwardly from the annular ring 64. The elastomeric indicator portion 66 defines a centrally located aperture 70 through the visual indicator 62 for receiving the first conduit 12 therethrough during assembly of the fitting 10c. In the installed condition, the central portion 68 becomes disposed between the first conduit 12 and the nut 22c in a first condition of the visual indicator, as depicted in FIGS. 17 and 18. As the nut 22c is threadably screwed onto the second conduit 14, the shoulder 24 on the first conduit 12 engages and begins to compress the elastomeric indicator portion 66 whereby the central portion 68 is forced in an axial direction toward the first distal end 28 of the nut 22c until the elastomeric indicator becomes visible from the exterior of the nut 22c in a second condition of the visual indicator 62, as depicted in FIGS. 19 and 20, when the fitting 10c is in the fully tightened condition.

Figure 25:
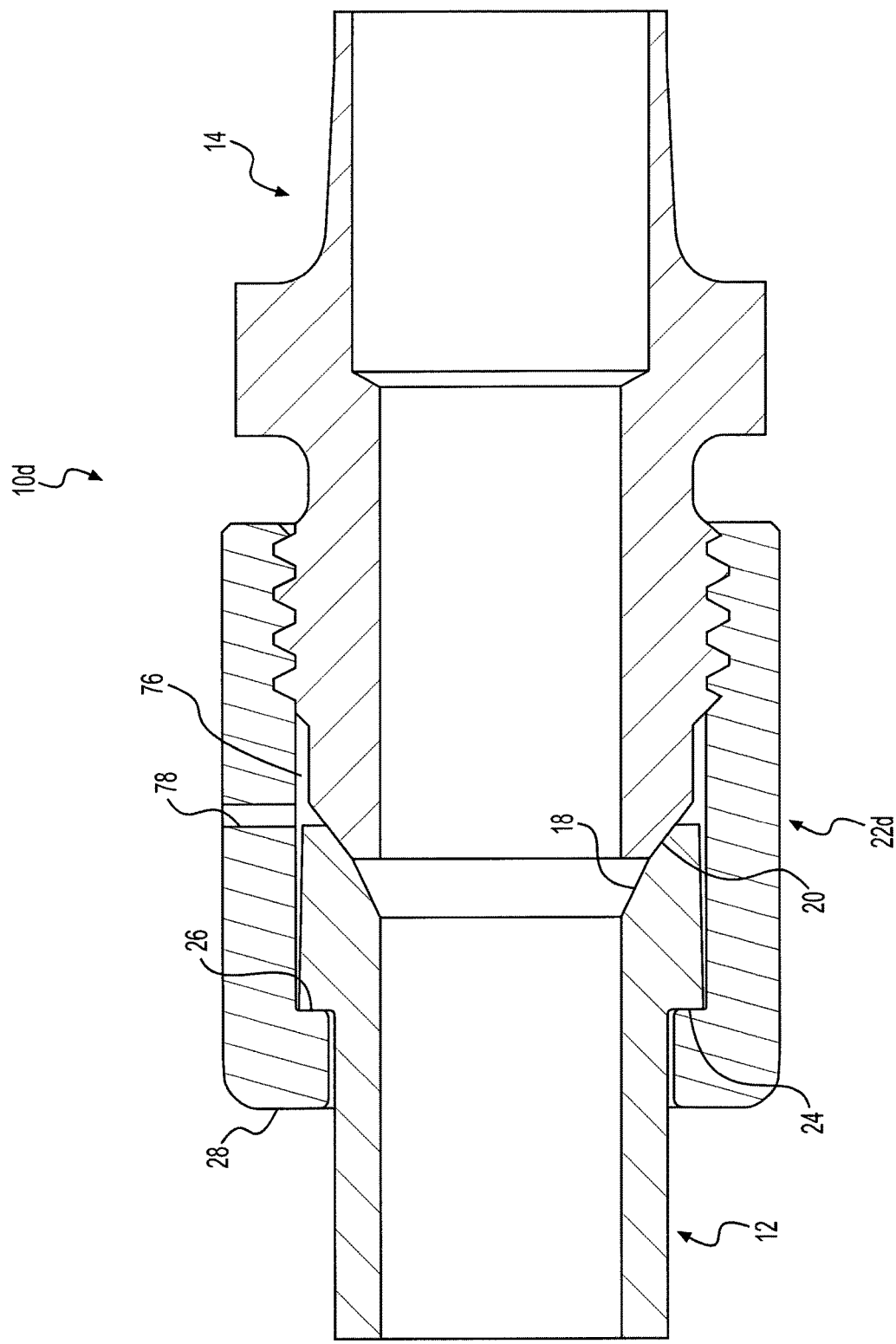
FIG. 25 is a cross-sectional view of the fitting of FIG. 24 in the second condition.
Figure 26:
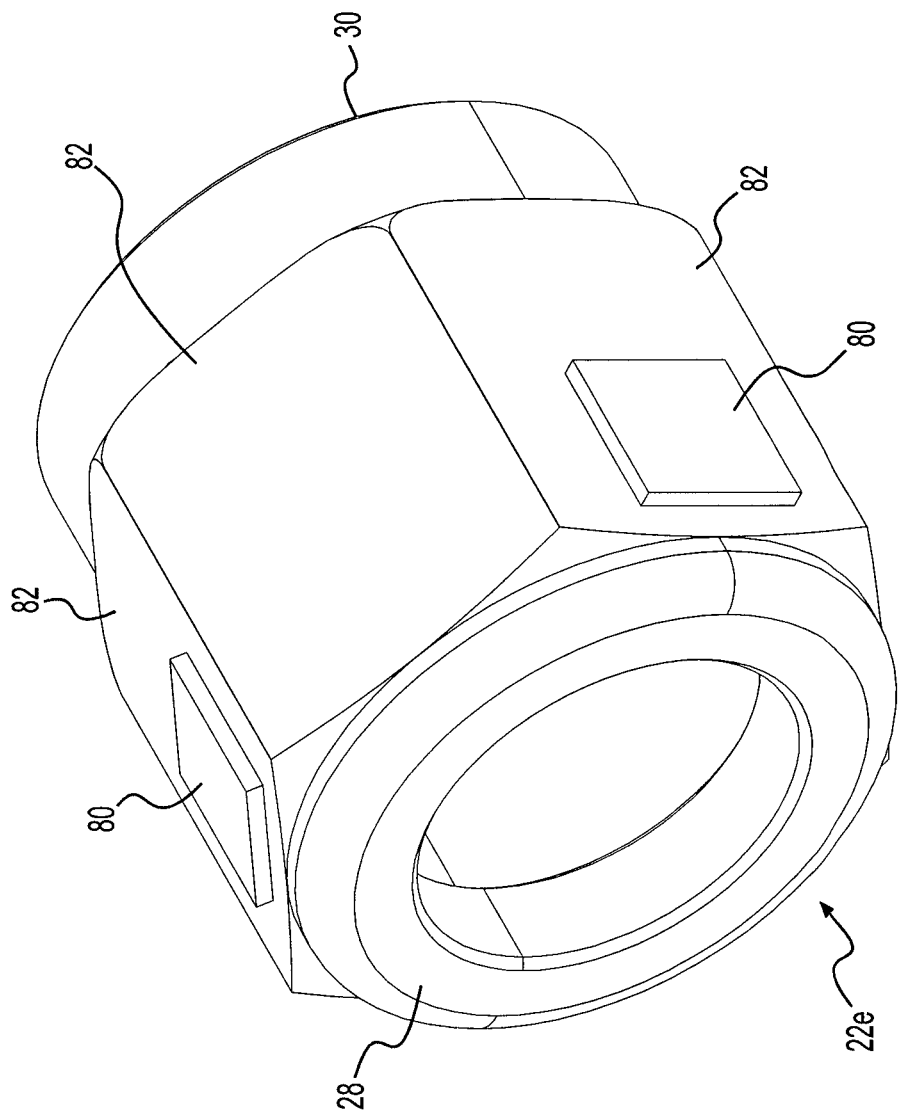
FIG. 26 is a perspective view of an exemplary embodiment of an instrumented nut for use in a fluid-tight fitting in accordance with the principles of the present disclosure.

FIGS. 21-25 depict a fifth exemplary embodiment of a fluid-tight fitting 10d in accordance with the principles of the present disclosure, wherein a fully tightened condition of the fitting 10d may be readily determined. In this embodiment, the first and second conduits 12, 14 and the nut 22d define an interior chamber 76 between the inner surface of the nut 22d and the intersection of the first and second conduits 12, 14 when the fitting 10d is in the fully tightened condition of the assembly, as depicted in FIG. 25. At least one radially extending passage 78 is formed through the nut 22d, between the outer surface and the inner surface, to provide fluid communication with the interior chamber 76 at least in the fully tightened condition of the fitting 10d. The passage 78 may be coupled with a source of positive or negative (vacuum) pressure, and the pressure of the interior chamber 76 may be monitored to determine whether the pressure of the interior chamber 76 is changing. When the pressure of the interior chamber 76 does not change, this indicates a proper seal between the surfaces of the first and second conduits 12, 14 and the nut 22d, thereby indicating that the fitting 10d is fully tightened. In the embodiment shown, a single passage 78 is provided in the nut 22d. It will be appreciated, however, that the nut 22d may alternatively include more than one passage 78 communicating with the interior chamber 76. In embodiments having more than one passage 78 communicating with the interior chamber 76, the nut 22d may include features associated with the passages 78 that provide "check-valve" type functionality to facilitate pressurization of the interior chamber 76 through only one of the passages 78. Alternatively, equipment for pressurizing and monitoring the interior chamber 76 may include sealing features that engage and seal all but one of the passages 78 through the nut 22d.

FIGS. 26-30 depict additional exemplary embodiments of nuts in accordance with the principles of the present disclosure. In these embodiments, the nuts are instrumented with one or more strain gauges configured to sense strain in the nuts resulting from forces associated with a tightened condition of the fittings. In one embodiment depicted in FIG. 26, one or more strain gauges 80 may be applied to outer circumferential surfaces 82 of the nut 22e to sense the stress experienced by the nut 22e. Alternatively, strain gauges may be applied to various other surfaces of the nut 22e suitable for sensing strain experienced by the nut 22e and associated with a tightened condition of the fitting that utilizes the nut 22e. In one embodiment, three or more strain gauges 80 are applied to the nut 22e to detect strain experienced by the nut 22e. It will be appreciated that various other numbers if strain gauges 80 may alternatively be used to facilitate sensing strain in the nut 22e.

Figure 27:
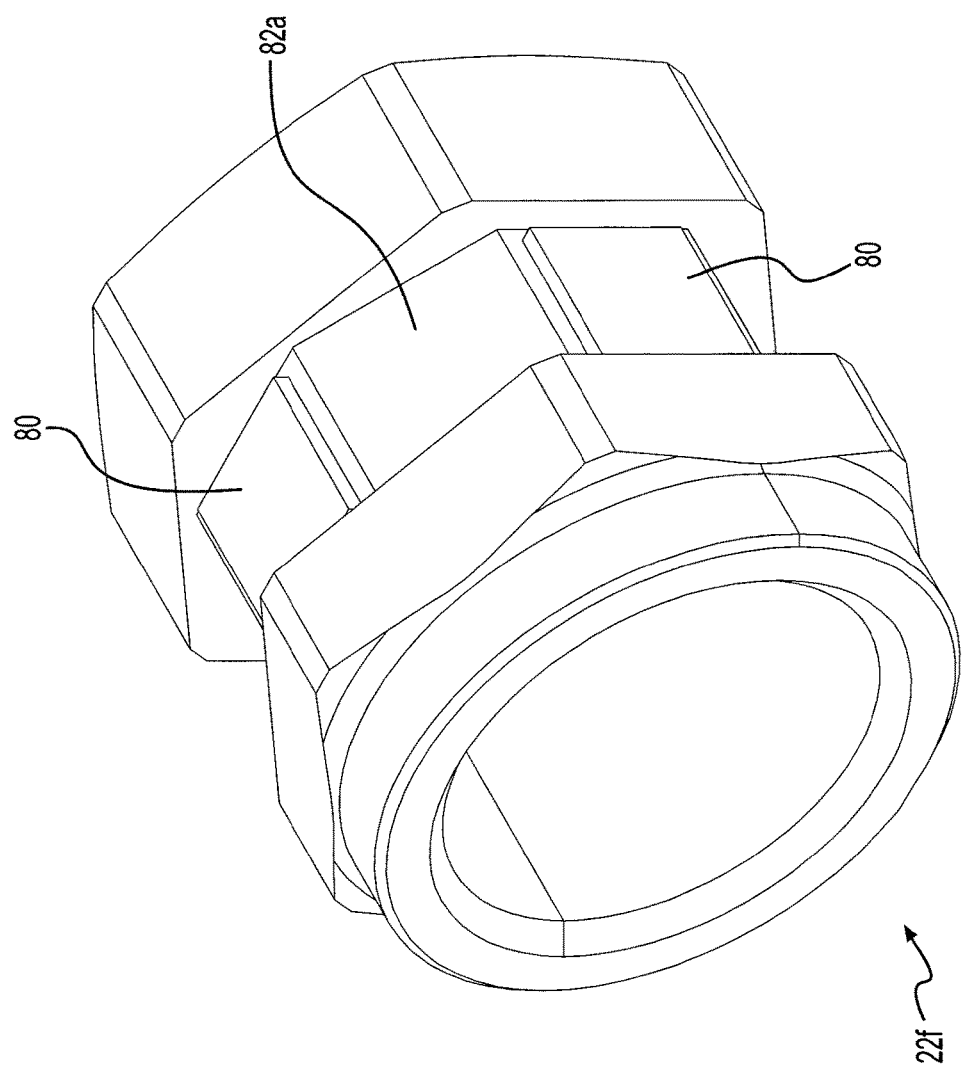
FIG. 27 is a perspective view of a second exemplary embodiment of an instrumented nut for use in a fluid-tight fitting in accordance with the principles of the present disclosure.
Figure 28:
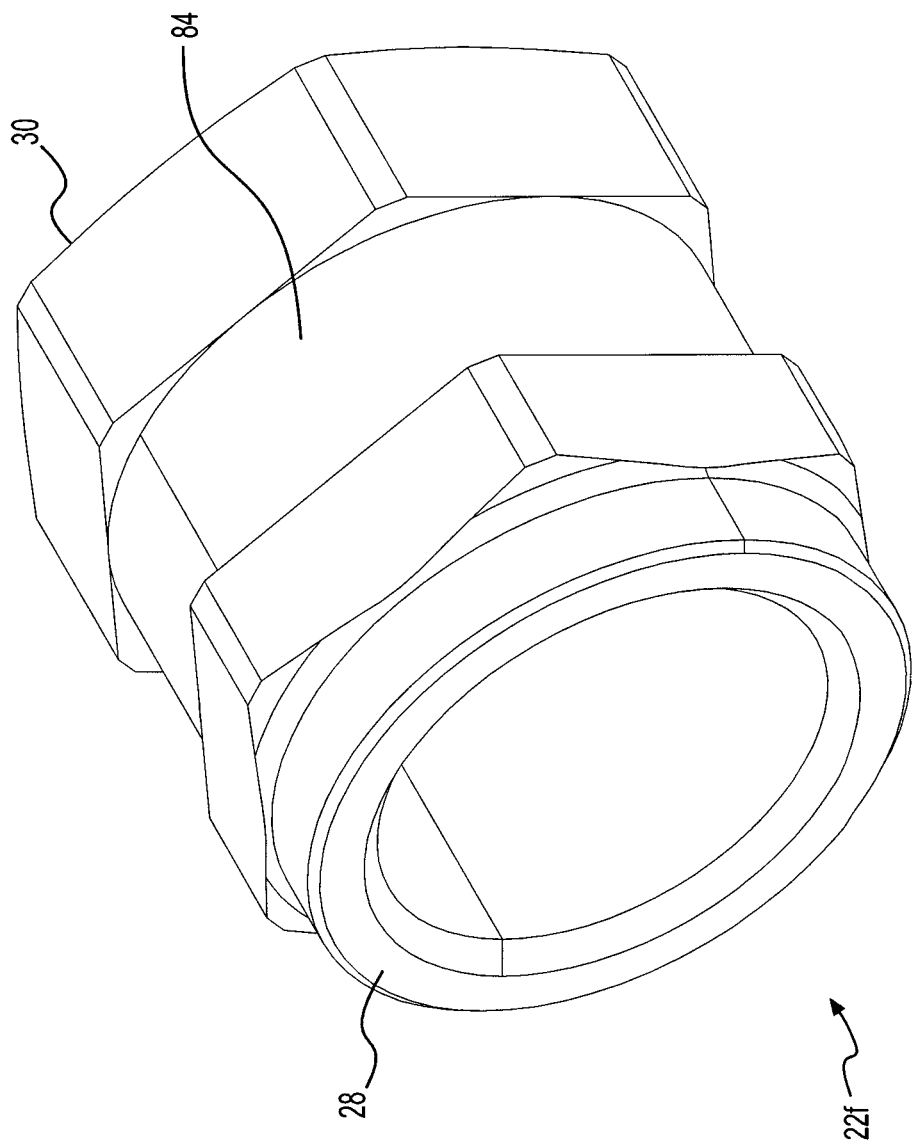
FIG. 28 is a perspective view of the instrumented nut of FIG. 27, including a protective element.

FIG. 27 depicts another exemplary embodiment of a nut 22f wherein strain gauges 80 are disposed on a reduced diameter portion 82a of the nut 22f in order to protect the strain gauges 80 from contact with tools that may be used to tighten the nut 22f in the fitting. The strain gauges 80 may be covered by a suitable protective element 84 extending around the reduced diameter portion 82a and that provides a barrier between the strain gauges 80 and any tool or other object which may come in contact with the nut 22f, as depicted in FIG. 28.

Figure 29:
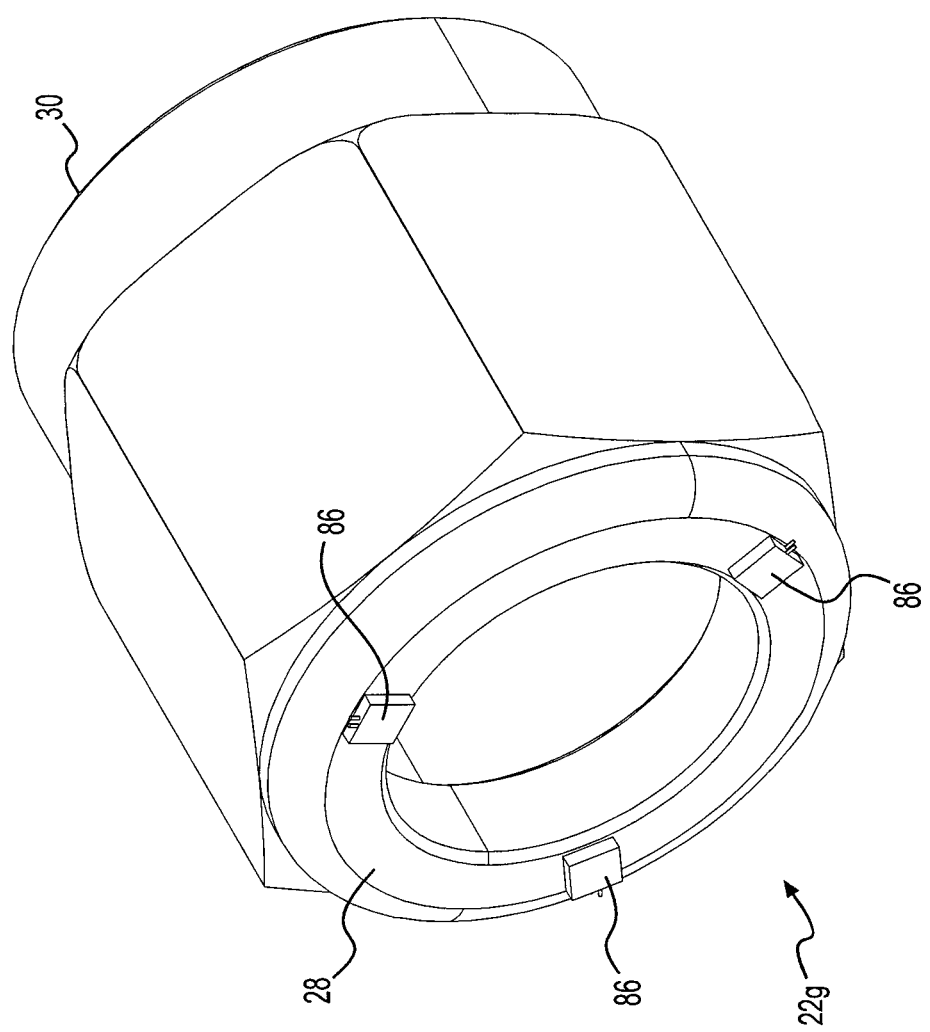
FIG. 29 is a perspective view of a third exemplary embodiment of an instrumented nut for use in a fluid-tight fitting in accordance with the principles of the present disclosure.

In the embodiment shown in FIG. 29, one or more strain gauges 86 may be disposed on the distal first end of nut 22g for sensing strain experienced by the nut 22g and associated with the tightened condition of the fitting.

Exemplary nuts in accordance with the embodiments disclosed in FIGS. 26-29 may further include communication circuitry configured to communicate signals from the strain gauges related to stress experienced by the nuts. In one embodiment, the communication circuitry may be in the form of RFID devices associated with the strain gauges. A reading device (not shown) may be used with the communication circuitry, such as RFID tags, for example, to receive signals from the communication circuitry. The signals may thereafter be processed to verify whether the nuts are properly tightened. Historical data related to the signals may be stored and tracked to facilitate determining maintenance or other actions that may be desired with respect to individual nuts or groups of nuts.

Figure 30:
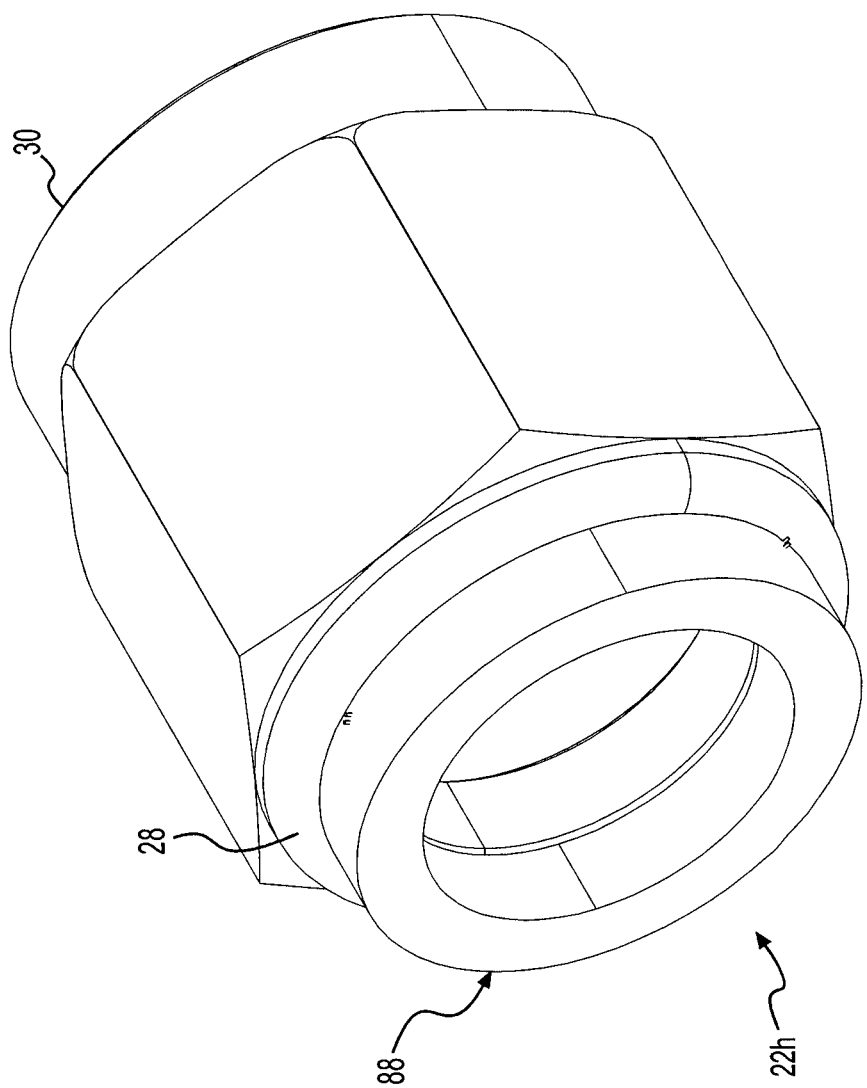
FIG. 30 is a perspective view of a fourth exemplary embodiment of an instrumented nut for use in a fluid-tight fitting in accordance with the principles of the present disclosure.

FIG. 30 illustrates another exemplary embodiment of a nut 22h wherein a capsule 88 is disposed on the first end 28 of the nut 22h and which comprises strain gauges and/or other circuitry adapted to facilitate sensing strain experienced by the nut 22h and associated with a tightened condition of the nut 22h in a fluid-tight fitting. The capsule may be provided with the nut 22h, or the capsule may be configured to facilitate retrofit of existing nuts for sensing strain associated with a tightened condition as described above.

In additional exemplary embodiments in accordance with the principles of the present disclosure, any of the nuts configurations discussed above may further include one or more features that facilitate threadably connecting the nut with the corresponding threads 34 on the second conduit 14. In one embodiment, the nuts may be processed such that the first incomplete thread adjacent the second distal end 30 is removed to facilitate screwing the nut onto the corresponding threads 34 of the second conduit 14 while minimizing or eliminating the potential for cross-threading. In another embodiment, nuts in accordance with the present disclosure may further include a smooth bore passageway extending outwardly from the threads at the second distal end 30 of the nut. The passageway facilitates proper alignment of the interior threads of the nut with the corresponding threads 34 on the second conduit 14 during initiation of screwing the nut together with the second conduit so that the potential for cross-threading is minimized or eliminated. Avoidance of cross-threading between the nut and the second conduit improves sealing integrity of the fluid-tight connection.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the scope of the general inventive concept.

The invention claimed is:

1. A nut assembly for use in a fluid-tight assembly, the fluid-tight assembly including a first conduit having a first distal end and a second conduit having a first threaded portion, the nut assembly comprising:
   a nut body configured to be received over the first end of the first conduit and having a second threaded portion engageable with the first threaded portion of the second conduit; and
   a visual indicator associated with the nut body, the visual indicator having a first condition wherein an indicating portion of the visual indicator is hidden from view relative to the exterior of the nut, and a second condition wherein the indicating portion of the visual indicator is visible from the exterior of the nut when the fluid-tight assembly is fully tightened;
   wherein the visual indicator comprises one of:
   A. at least one leg disposed within the nut body, the leg moved by engagement with the first conduit between the first and second condition; or B. an annular ring received within the nut body, and
a separate elastomeric indicator portion disposed on the annular ring and having a central portion extending radially inwardly from the ring,
the central portion disposed between the first conduit and the nut body in an installed condition of the assembly,
wherein the elastomeric indicator is compressed by the first conduit in the second condition such that the central portion is forced to a position visible from the exterior of the nut body;
wherein, when the visual indicator comprises at least one leg, the at least one leg is formed from metal material and at least one of:
the at least one leg has a bent L-shape having a first portion with a distal end that engages the first conduit during tightening of the nut, or
the at least one leg is formed from flexible material, such that the at least one leg is hidden from view when the fluid-tight assembly is loosened from the fully-tightened condition and the leg is moved from the second condition to the first condition.

2. The nut assembly of claim 1, wherein the visual indicator comprises at least one leg disposed within the nut body, and
the at least one leg is deflected into the second condition by engagement with the first conduit when the fluid-tight assembly is fully tightened.

3. The nut assembly of claim 1, wherein the leg is treated to facilitate visual perception in the second condition.

4. A fluid tight assembly, comprising:
a first conduit having a first distal end;
a second conduit having a first threaded portion; and
a nut assembly according to claim 1, the nut received over the first end of the first conduit and engaged with the first threaded portion of the second conduit.

5. A method of inspecting a fluid-tight assembly, the fluid-tight assembly comprising a first conduit, a second conduit, and a nut coupled with the first and second conduits, wherein the nut is the nut of a nut assembly of claim 1, the method comprising:
viewing at least a portion of the exterior of the fluid tight-assembly; and
identifying the presence or absence of the visual indicator.

6. A method of forming a fluid-tight coupling between a first conduit having a first distal end and a second conduit having a first threaded portion, the method comprising:
placing a nut onto the first distal end of the first conduit, wherein the nut comprises a nut assembly according to claim 1;
threadably engaging the nut with the first threaded portion of the second conduit;
tightening the nut to form the fluid-tight coupling; and
confirming a tightened condition of the coupling by viewing the indicating portion of the visual indicator from the exterior of the nut.

7. The method of claim 6, wherein:
the nut assembly comprises at least one leg disposed within the nut; and
tightening the nut comprises moving the at least one leg by engagement of the leg with the first conduit.

8. The method of claim 7, wherein moving the at least one leg by engagement of the leg with the first conduit comprises deflecting the at least one leg by engagement with the first conduit.

9. A nut assembly for use in a fluid-tight assembly, the fluid-tight assembly including a first conduit having a first distal end and a second conduit having a first threaded portion, the nut assembly comprising:
a nut body configured to be received over the first end of the first conduit and having a second threaded portion engageable with the first threaded portion of the second conduit;
a visual indicator associated with the nut body, the visual indicator having a first condition wherein an indicating portion of the visual indicator is hidden from view relative to the exterior of the nut, and a second condition wherein the indicating portion of the visual indicator is visible from the exterior of the nut when the fluid-tight assembly is fully tightened;
wherein the visual indicator comprises one of:
A. at least one leg disposed within the nut body, the leg moved by engagement with the first conduit between the first and second condition; or
B. an annular ring received within the nut body, and
an elastomeric indicator portion disposed on the annular ring and having a central portion extending radially inwardly from the ring,
the central portion disposed between the first conduit and the nut body in an installed condition of the assembly,
wherein the elastomeric indicator is compressed by the first conduit in the second condition such that the central portion is forced to a position visible from the exterior of the nut body;
wherein, when the visual indicator comprises at least one leg, at least one of:
the at least one leg has a bent L-shape having a first portion with a distal end that engages the first conduit during tightening of the nut, or
the at least one leg is formed from flexible material, such that the at least one leg is hidden from view when the fluid-tight assembly is loosened from the fully-tightened condition and the leg is moved from the second condition to the first condition; and
at least one slot formed in the interior of the nut body, the at least one slot extending along an axial direction thereof and configured for receiving the at least one leg.

* * * * *